US012438677B2

(12) United States Patent
Hao et al.

(10) Patent No.: US 12,438,677 B2
(45) Date of Patent: Oct. 7, 2025

(54) CORRELATION OF MULTIPLE CHANNEL STATE INFORMATION REPORTS FOR MULTI-LAYER COMMUNICATION

(71) Applicant: QUALCOMM Incorporated, San Diego, CA (US)

(72) Inventors: Chenxi Hao, Beijing (CN); Qiaoyu Li, Beijing (CN); Yu Zhang, San Diego, CA (US); Liangming Wu, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 17/759,693

(22) PCT Filed: Feb. 14, 2020

(86) PCT No.: PCT/CN2020/075185
§ 371 (c)(1),
(2) Date: Jul. 28, 2022

(87) PCT Pub. No.: WO2021/159433
PCT Pub. Date: Aug. 19, 2021

(65) Prior Publication Data
US 2023/0087003 A1    Mar. 23, 2023

(51) Int. Cl.
*H04L 5/00* (2006.01)
*H04B 7/06* (2006.01)

(52) U.S. Cl.
CPC ......... *H04L 5/0057* (2013.01); *H04B 7/0626* (2013.01)

(58) Field of Classification Search
CPC ... H04L 5/0057; H04L 5/0023; H04L 5/0094; H04B 7/0626; H04B 7/0632
See application file for complete search history.

(56) References Cited

U.S. PATENT DOCUMENTS 10,361,827 B2   7/2019 Sayana et al.
11,375,527 B1*  6/2022 Eyuboglu .......... H04B 7/15528
(Continued)

FOREIGN PATENT DOCUMENTS

CN      107294583 A    10/2017
CN      108039903 A    5/2018
(Continued)

OTHER PUBLICATIONS

Samsung: "Enhancement to CSI Feedback", 3GPP TSG RAN WG1 Meeting #89, R1-1707915—FECOMP Enhancement to CSI Feedback_SAM_V2, 3rd Generation Partnership Project (3GPP), Mobile Competence Centre, 650, Route Des Lucioles, F-06921 Sophia-Antipolis Cedex, France, vol. RAN WG1, No. Hangzhou, China, May 15, 2017-May 19, 2017, 5 Pages, May 14, 2017 (May 14, 2017), XP051273114, pp. 2-4.
(Continued)

*Primary Examiner* — Kodzovi Acolatse
*Assistant Examiner* — Anindita Sen
(74) *Attorney, Agent, or Firm* — Harrity & Harrity, LLP\Qualcomm

(57) ABSTRACT

Various aspects of the present disclosure generally relate to wireless communication. In some aspects, a UE may receive multiple CSI report configurations that include at least a first CSI report configuration and a second CSI report configuration that are associated with one or more CSI reference resources; determine a dependency between the first CSI report configuration and the second CSI report configuration; and calculate at least one of a first CSI for the first CSI report configuration or a second CSI for the second CSI report configuration based at least in part on an assumption of a joint transmission using the one or more CSI reference resources, wherein the assumption is based at least in part on the determination of the dependency. report at least one of
(Continued)

the first CSI in a first CSI report or the second CSI in a second CSI report. Numerous other aspects are provided.

30 Claims, 18 Drawing Sheets

(56) References Cited

U.S. PATENT DOCUMENTS

| | | | | |
|---|---|---|---|---|
| 11,522,623 | B2* | 12/2022 | Zhu | H04B 17/318 |
| 11,990,964 | B2* | 5/2024 | Zhu | H04W 24/10 |
| 2014/0010126 | A1* | 1/2014 | Sayana | H04J 3/1694 |
| | | | | 370/336 |
| 2019/0081679 | A1 | 3/2019 | Davydov et al. | |
| 2019/0149211 | A1 | 5/2019 | Nilsson et al. | |
| 2019/0222283 | A1 | 7/2019 | Yum et al. | |
| 2020/0336194 | A1* | 10/2020 | Karjalainen | H04B 7/0695 |
| 2021/0184817 | A1* | 6/2021 | Nammi | H04L 5/0051 |
| 2022/0029682 | A1* | 1/2022 | Park | H04B 7/0626 |
| 2022/0077969 | A1* | 3/2022 | Kim | H04L 1/1861 |
| 2022/0095254 | A1* | 3/2022 | Zhu | H04L 5/005 |
| 2022/0140878 | A1* | 5/2022 | Zhu | H04B 7/0626 |
| | | | | 370/252 |
| 2022/0141071 | A1* | 5/2022 | Namba | H04L 5/001 |
| | | | | 375/267 |
| 2022/0263633 | A1* | 8/2022 | Rahman | H04B 7/024 |
| 2022/0352933 | A1* | 11/2022 | Rakib | H04L 5/0023 |
| 2022/0369293 | A1* | 11/2022 | Yang | H04L 5/0051 |
| 2023/0199517 | A1* | 6/2023 | Laddu | H04B 7/022 |
| | | | | 370/329 |
| 2023/0388997 | A1* | 11/2023 | Mondal | H04L 5/0023 |
| 2024/0333353 | A1* | 10/2024 | Hindy | H04B 7/0632 |

FOREIGN PATENT DOCUMENTS

| | | |
|---|---|---|
| CN | 110463128 A | 11/2019 |
| EP | 3609100 A1 | 2/2020 |
| WO | 2019100257 A1 | 5/2019 |
| WO | 2020029176 A1 | 2/2020 |

OTHER PUBLICATIONS

Supplementary European Search Report—EP20918823—Search Authority—Munich—Sep. 25, 2023.
International Search Report and Written Opinion—PCT/CN2020/075185—ISA/EPO—Nov. 19, 2020.
Huawei., et al., "CSI Measurement Enhancement for Multi-TRP/Panel Transmission", 3GPP TSG RAN WG1 Meeting #96bis, R1-1903982, 3rd Generation Partnership Project, Mobile Competence Centre, 650, Route Des Lucioles, F-06921 Sophia-Antipolis Cedex, France, vol. RAN WG1, No. Xi'an, China, Apr. 8-12, 2019, XP051699395, 6 Pages.
Huawei et al., "On the Need for More Flexible Configurations Related to CSI Reporting", R1-1611237, 3GPP TSG RAN WG1 Meeting #87 Reno, USA, Nov. 14-18, 2016, 6 pages.

* cited by examiner

CORRELATION OF MULTIPLE CHANNEL STATE INFORMATION REPORTS FOR MULTI-LAYER COMMUNICATION

CROSS-REFERENCE TO RELATED APPLICATION

This application is a 371 national stage of Patent Cooperation Treaty (PCT) Application No. PCT/CN2020/075185 filed on Feb. 14, 2020, entitled "CORRELATION OF MULTIPLE CHANNEL STATE INFORMATION REPORTS FOR MULTI-LAYER COMMUNICATION," which is hereby expressly incorporated by reference herein.

FIELD OF THE DISCLOSURE

Aspects of the present disclosure generally relate to wireless communication and to techniques and apparatuses for correlating multiple channel state information reports for multi-layer communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division-multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include receiving multiple channel state information (CSI) report configurations that include at least a first CSI report configuration and a second CSI report configuration that are associated with one or more CSI reference resources; determining a dependency between the first CSI report configuration and the second CSI report configuration; and calculating at least one of a first CSI for the first CSI report configuration or a second CSI for the second CSI report configuration based at least in part on an assumption of a joint transmission using the one or more CSI reference resources, wherein the assumption is based at least in part on the determination of the dependency, and reporting at least one of the first CSI in a first CSI report or the second CSI in a second CSI report.

In some aspects, a method of wireless communication, performed by a UE, may include receiving an aggregate CSI report configuration that includes at least a first CSI report configuration and a second CSI report configuration that are associated with a CSI reference resource; determining that the first CSI report configuration and the second CSI report configuration are mutually dependent; and calculating a first CSI for the first CSI report configuration and a second CSI for the second CSI report configuration based at least in part on an assumption of a joint transmission using the CSI reference resource, wherein the assumption is based at least in part on inclusion of the first CSI report configuration and the second CSI report configuration in the aggregate CSI report configuration and the determination that the first CSI report configuration and the second CSI report configuration are mutually dependent.

In some aspects, a method of wireless communication, performed by a UE, may include receiving a CSI report configuration that indicates a plurality of non-zero power CSI-reference signal (NZP CSI-RS) resources for channel measurement or a plurality of NZP CSI-RS port-groups for channel measurement, wherein the CSI report configuration includes a rank indication pair restriction that indicates a combination of rank indications that are permitted to be reported if multiple resources of the plurality of NZP CSI-RS resources or multiple port-groups of the plurality of NZP CSI-RS port groups are selected by the UE; and calculating CSI based at least in part on an assumption of a joint transmission using multiple resources of the plurality of NZP CSI-RS resources or multiple port-groups of the plurality of NZP CSI-RS port-groups based at least in part on the rank indication pair restriction.

In some aspects, a method of wireless communication, performed by a base station, may include transmitting multiple CSI report configurations that include at least a first CSI report configuration and a second CSI report configuration that are associated with one or more CSI reference resources; determining a dependency between the first CSI report configuration and the second CSI report configuration; and receiving at least one of a first CSI in a first CSI report for the first CSI report configuration or a second CSI in a second CSI report for the second CSI report configuration, wherein the at least one of the first CSI and the second CSI are calculated based at least in part on an assumption of a joint transmission using the one or more CSI reference resources, wherein the assumption is based at least in part on the dependency.

In some aspects, a method of wireless communication, performed by a base station, may include determining that a first CSI report configuration and a second CSI report configuration are mutually dependent; transmitting an aggregate CSI report configuration that includes at least the first CSI report configuration and the second CSI report configuration that are associated with a CSI reference resource; and receiving at least one of a first CSI for the first CSI report configuration and a second CSI for the second CSI report configuration based at least in part on an assumption of a joint transmission using the CSI reference resource, wherein the assumption is based at least in part on inclusion of the first CSI report configuration and the second CSI report configuration in the aggregate CSI report configuration and the determination that the first CSI report configuration and the second CSI report configuration are mutually dependent.

In some aspects, a method of wireless communication, performed by a base station, may include transmitting a CSI report configuration that indicates a plurality of NZP CSI-RS resources for channel measurement or a plurality of NZP CSI-RS port-groups for channel measurement, wherein the CSI report configuration includes a rank indication pair restriction that indicates a combination of rank indications that are permitted to be reported if multiple resources of the plurality of NZP CSI-RS resources or multiple port-groups of the plurality of NZP CSI-RS port groups are selected by a UE; and receiving CSI calculated based at least in part on an assumption of a joint transmission using multiple resources of the plurality of NZP CSI-RS resources or multiple port-groups of the plurality of NZP CSI-RS port-groups based at least in part on the rank indication pair restriction.

In some aspects, a UE for wireless communication may include memory and one or more processors operatively coupled to the memory. The memory and the one or more processors may be configured to receive multiple CSI report configurations that include at least a first CSI report configuration and a second CSI report configuration that are associated with one or more CSI reference resources; determine a dependency between the first CSI report configuration and the second CSI report configuration; and calculate at least one of a first CSI for the first CSI report configuration or a second CSI for the second CSI report configuration based at least in part on an assumption of a joint transmission using the one or more CSI reference resources, wherein the assumption is based at least in part on the determination of the dependency. report at least one of the first CSI in a first CSI report or the second CSI in a second CSI report.

In some aspects, a UE for wireless communication may include memory and one or more processors operatively coupled to the memory. The memory and the one or more processors may be configured to receive an aggregate CSI report configuration that includes at least a first CSI report configuration and a second CSI report configuration that are associated with a CSI reference resource; determine that the first CSI report configuration and the second CSI report configuration are mutually dependent; and calculate a first CSI for the first CSI report configuration and a second CSI for the second CSI report configuration based at least in part on an assumption of a joint transmission using the CSI reference resource, wherein the assumption is based at least in part on inclusion of the first CSI report configuration and the second CSI report configuration in the aggregate CSI report configuration and the determination that the first CSI report configuration and the second CSI report configuration are mutually dependent.

In some aspects, a UE for wireless communication may include memory and one or more processors operatively coupled to the memory. The memory and the one or more processors may be configured to receive a CSI report configuration that indicates a plurality of NZP CSI-RS resources for channel measurement or a plurality of NZP CSI-RS port-groups for channel measurement, wherein the CSI report configuration includes a rank indication pair restriction that indicates a combination of rank indications that are permitted to be reported if multiple resources of the plurality of NZP CSI-RS resources or multiple port-groups of the plurality of NZP CSI-RS port groups are selected by the UE; and calculate CSI based at least in part on an assumption of a joint transmission using multiple resources of the plurality of NZP CSI-RS resources or multiple port-groups of the plurality of NZP CSI-RS port-groups based at least in part on the rank indication pair restriction.

In some aspects, a base station for wireless communication may include memory and one or more processors operatively coupled to the memory. The memory and the one or more processors may be configured to transmit multiple CSI report configurations that include at least a first CSI report configuration and a second CSI report configuration that are associated with one or more CSI reference resources; determine a dependency between the first CSI report configuration and the second CSI report configuration; and receive at least one of a first CSI in a first CSI report for the first CSI report configuration or a second CSI in a second CSI report for the second CSI report configuration, wherein the at least one of the first CSI and the second CSI are calculated based at least in part on an assumption of a joint transmission using the one or more CSI reference resources, wherein the assumption is based at least in part on the dependency.

In some aspects, a base station for wireless communication may include memory and one or more processors operatively coupled to the memory. The memory and the one or more processors may be configured to determine that a first CSI report configuration and a second CSI report configuration are mutually dependent; transmit an aggregate CSI report configuration that includes at least the first CSI report configuration and the second CSI report configuration that are associated with a CSI reference resource; and receive at least one of a first CSI for the first CSI report configuration and a second CSI for the second CSI report configuration based at least in part on an assumption of a joint transmission using the CSI reference resource, wherein the assumption is based at least in part on inclusion of the first CSI report configuration and the second CSI report configuration in the aggregate CSI report configuration and the determination that the first CSI report configuration and the second CSI report configuration are mutually dependent.

In some aspects, a base station for wireless communication may include memory and one or more processors operatively coupled to the memory. The memory and the one or more processors may be configured to transmit a CSI report configuration that indicates a plurality of NZP CSI-RS resources for channel measurement or a plurality of NZP CSI-RS port-groups for channel measurement, wherein the CSI report configuration includes a rank indication pair restriction that indicates a combination of rank indications that are permitted to be reported if multiple resources of the plurality of NZP CSI-RS resources or multiple port-groups of the plurality of NZP CSI-RS port groups are selected by a UE; and receive CSI calculated based at least in part on an assumption of a joint transmission using multiple resources of the plurality of NZP CSI-RS resources or multiple port-groups of the plurality of NZP CSI-RS port-groups based at least in part on the rank indication pair restriction.

In some aspects, a non-transitory computer-readable medium may store one or more instructions for wireless communication. The one or more instructions, when executed by one or more processors of a UE, may cause the one or more processors to: receive multiple CSI report configurations that include at least a first CSI report configuration and a second CSI report configuration that are associated with one or more CSI reference resources; determine a dependency between the first CSI report configuration and the second CSI report configuration; and calculate at least one of a first CSI for the first CSI report configuration or a second CSI for the second CSI report configuration based at least in part on an assumption of a joint transmission using the one or more CSI reference resources, wherein the assumption is based at least in part on the determination of the dependency. report at least one of the first CSI in a first CSI report or the second CSI in a second CSI report.

In some aspects, a non-transitory computer-readable medium may store one or more instructions for wireless communication. The one or more instructions, when executed by one or more processors of a UE, may cause the one or more processors to: receive an aggregate CSI report configuration that includes at least a first CSI report configuration and a second CSI report configuration that are associated with a CSI reference resource; determine that the first CSI report configuration and the second CSI report configuration are mutually dependent; and calculate a first CSI for the first CSI report configuration and a second CSI for the second CSI report configuration based at least in part on an assumption of a joint transmission using the CSI reference resource, wherein the assumption is based at least in part on inclusion of the first CSI report configuration and the second CSI report configuration in the aggregate CSI report configuration and the determination that the first CSI report configuration and the second CSI report configuration are mutually dependent.

In some aspects, a non-transitory computer-readable medium may store one or more instructions for wireless communication. The one or more instructions, when executed by one or more processors of a UE, may cause the one or more processors to: receive a CSI report configuration that indicates a plurality of NZP CSI-RS resources for channel measurement or a plurality of NZP CSI-RS port-groups for channel measurement, wherein the CSI report configuration includes a rank indication pair restriction that indicates a combination of rank indications that are permitted to be reported if multiple resources of the plurality of NZP CSI-RS resources or multiple port-groups of the plurality of NZP CSI-RS port groups are selected by the UE; and calculate CSI based at least in part on an assumption of a joint transmission using multiple resources of the plurality of NZP CSI-RS resources or multiple port-groups of the plurality of NZP CSI-RS port-groups based at least in part on the rank indication pair restriction.

In some aspects, a non-transitory computer-readable medium may store one or more instructions for wireless communication. The one or more instructions, when executed by one or more processors of a base station, may cause the one or more processors to: transmit multiple CSI report configurations that include at least a first CSI report configuration and a second CSI report configuration that are associated with one or more CSI reference resources; determine a dependency between the first CSI report configuration and the second CSI report configuration; and receive at least one of a first CSI in a first CSI report for the first CSI report configuration or a second CSI in a second CSI report for the second CSI report configuration, wherein the at least one of the first CSI and the second CSI are calculated based at least in part on an assumption of a joint transmission using the one or more CSI reference resources, wherein the assumption is based at least in part on the dependency.

In some aspects, a non-transitory computer-readable medium may store one or more instructions for wireless communication. The one or more instructions, when executed by one or more processors of a base station, may cause the one or more processors to: determine that a first CSI report configuration and a second CSI report configuration are mutually dependent; transmit an aggregate CSI report configuration that includes at least the first CSI report configuration and the second CSI report configuration that are associated with a CSI reference resource; and receive at least one of a first CSI for the first CSI report configuration and a second CSI for the second CSI report configuration based at least in part on an assumption of a joint transmission using the CSI reference resource, wherein the assumption is based at least in part on inclusion of the first CSI report configuration and the second CSI report configuration in the aggregate CSI report configuration and the determination that the first CSI report configuration and the second CSI report configuration are mutually dependent.

In some aspects, a non-transitory computer-readable medium may store one or more instructions for wireless communication. The one or more instructions, when executed by one or more processors of a base station, may cause the one or more processors to: transmit a CSI report configuration that indicates a plurality of NZP CSI-RS resources for channel measurement or a plurality of NZP CSI-RS port-groups for channel measurement, wherein the CSI report configuration includes a rank indication pair restriction that indicates a combination of rank indications that are permitted to be reported if multiple resources of the plurality of NZP CSI-RS resources or multiple port-groups of the plurality of NZP CSI-RS port groups are selected by a UE; and receive CSI calculated based at least in part on an assumption of a joint transmission using multiple resources of the plurality of NZP CSI-RS resources or multiple port-groups of the plurality of NZP CSI-RS port-groups based at least in part on the rank indication pair restriction.

In some aspects, an apparatus for wireless communication may include means for receiving multiple CSI report configurations that include at least a first CSI report configuration and a second CSI report configuration that are associated with one or more CSI reference resources; means for determining a dependency between the first CSI report configuration and the second CSI report configuration; and means for calculating at least one of a first CSI for the first CSI report configuration or a second CSI for the second CSI report configuration based at least in part on an assumption of a joint transmission using the one or more CSI reference resources, wherein the assumption is based at least in part on the determination of the dependency. means for reporting at least one of the first CSI in a first CSI report or the second CSI in a second CSI report.

In some aspects, an apparatus for wireless communication may include means for receiving an aggregate CSI report configuration that includes at least a first CSI report configuration and a second CSI report configuration that are associated with a CSI reference resource; means for determining that the first CSI report configuration and the second CSI report configuration are mutually dependent; and means for calculating a first CSI for the first CSI report configuration and a second CSI for the second CSI report configuration based at least in part on an assumption of a joint transmission using the CSI reference resource, wherein the assumption is based at least in part on inclusion of the first CSI report configuration and the second CSI report configuration in the aggregate CSI report configuration and the determination that the first CSI report configuration and the second CSI report configuration are mutually dependent.

In some aspects, an apparatus for wireless communication may include means for receiving a CSI report configuration that indicates a plurality of NZP CSI-RS resources for channel measurement or a plurality of NZP CSI-RS port-groups for channel measurement, wherein the CSI report configuration includes a rank indication pair restriction that indicates a combination of rank indications that are permitted to be reported if multiple resources of the plurality of NZP CSI-RS resources or multiple port-groups of the plurality of NZP CSI-RS port groups are selected by the UE; and means for calculating CSI based at least in part on an assumption of a joint transmission using multiple resources of the plurality of NZP CSI-RS resources or multiple port-groups of the plurality of NZP CSI-RS port-groups based at least in part on the rank indication pair restriction.

In some aspects, an apparatus for wireless communication may include means for transmitting multiple CSI report configurations that include at least a first CSI report configuration and a second CSI report configuration that are associated with one or more CSI reference resources; means for determining a dependency between the first CSI report configuration and the second CSI report configuration; and means for receiving at least one of a first CSI in a first CSI report for the first CSI report configuration or a second CSI in a second CSI report for the second CSI report configuration, wherein the at least one of the first CSI and the second CSI are calculated based at least in part on an assumption of a joint transmission using the one or more CSI reference resources, wherein the assumption is based at least in part on the dependency.

In some aspects, an apparatus for wireless communication may include means for determining that a first CSI report configuration and a second CSI report configuration are mutually dependent; means for transmitting an aggregate CSI report configuration that includes at least the first CSI report configuration and the second CSI report configuration that are associated with a CSI reference resource; and means for receiving at least one of a first CSI for the first CSI report configuration and a second CSI for the second CSI report configuration based at least in part on an assumption of a joint transmission using the CSI reference resource, wherein the assumption is based at least in part on inclusion of the first CSI report configuration and the second CSI report configuration in the aggregate CSI report configuration and the determination that the first CSI report configuration and the second CSI report configuration are mutually dependent.

In some aspects, an apparatus for wireless communication may include means for transmitting a CSI report configuration that indicates a plurality of NZP CSI-RS resources for channel measurement or a plurality of NZP CSI-RS port-groups for channel measurement, wherein the CSI report configuration includes a rank indication pair restriction that indicates a combination of rank indications that are permitted to be reported if multiple resources of the plurality of NZP CSI-RS resources or multiple port-groups of the plurality of NZP CSI-RS port groups are selected by a UE; and means for receiving CSI calculated based at least in part on an assumption of a joint transmission using multiple resources of the plurality of NZP CSI-RS resources or multiple port-groups of the plurality of NZP CSI-RS port-groups based at least in part on the rank indication pair restriction.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
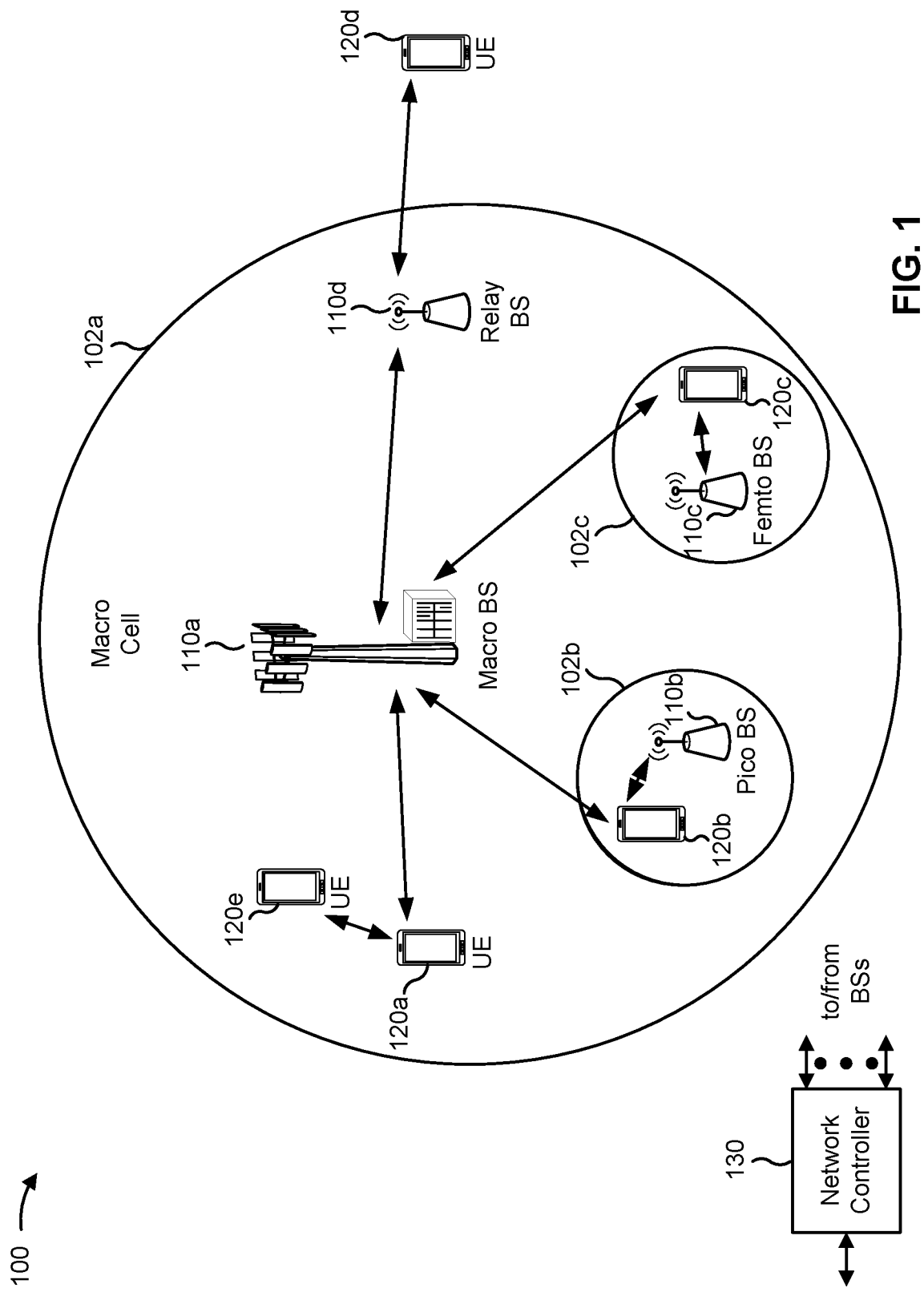
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
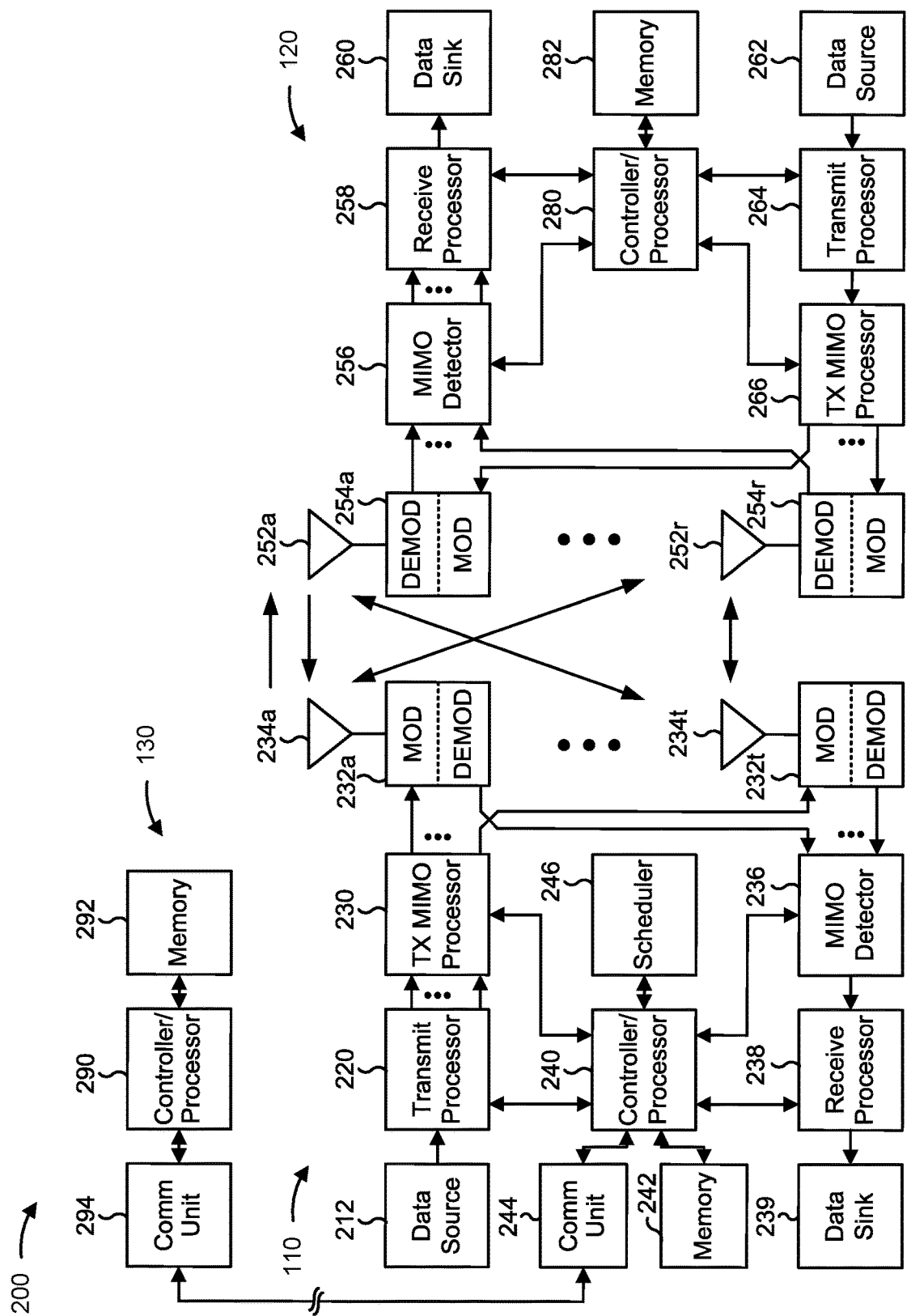
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with correlation of multiple CSI reports for multi-layer communication, as described in more detail elsewhere herein. For example, controller/processor 240 of base station 110, controller/processor 280 of UE 120, and/or any other component(s) of FIG. 2 may perform or direct operations of, for example, process 1300 of FIG. 13, process 1400 of FIG. 14, process 1500 of FIG. 15, process 1600 of FIG. 16, process 1700 of FIG. 17, process 1800 of FIG. 18, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1300 of FIG. 13, process 1400 of FIG. 14, process 1500 of FIG. 15, process 1600 of FIG. 16, process 1700 of FIG. 17, process 1800 of FIG. 18, and/or other processes as described herein. A scheduler 246 may schedule UEs for data transmission on the downlink and/or uplink.

In some aspects, UE 120 may include means for receiving multiple CSI report configurations that include at least a first CSI report configuration and a second CSI report configuration that are associated with one or more CSI reference resources; means for determining a dependency between the first CSI report configuration and the second CSI report configuration; means for calculating at least one of a first CSI for the first CSI report configuration or a second CSI for the second CSI report configuration based at least in part on an assumption of a joint transmission using the one or more CSI reference resources wherein the assumption is based at least in part on the determination of the dependency; means for reporting at least one of the first CSI in a first CSI report or the second CSI in a second CSI report, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving an aggregate CSI report configuration that includes at least a first CSI report configuration and a second CSI report configuration that are associated with a CSI reference resource; means for determining that the first CSI report configuration and the second CSI report configuration are mutually dependent; means for calculating a first CSI for the first CSI report configuration and a second CSI for the second CSI report configuration based at least in part on an assumption of a joint transmission using the CSI reference resource, wherein the assumption is based at least in part on inclusion of the first CSI report configuration and the second CSI report configuration in the aggregate CSI report configuration and the determination that the first CSI report configuration and the second CSI report configuration are mutually dependent; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving a CSI report configuration that indicates a plurality of NZP CSI-RS resources for channel measurement or a plurality of NZP CSI-RS port-groups for channel measurement, wherein the CSI report configuration includes a rank indication pair restriction that indicates a combination of rank indications that are permitted to be reported if multiple resources of the plurality of NZP CSI-RS resources or multiple port-groups of the plurality of NZP CSI-RS port groups are selected by the UE; means for calculating CSI based at least in part on an assumption of a joint transmission using multiple resources of the plurality of NZP CSI-RS resources or multiple port-groups of the plurality of NZP CSI-RS port-groups based at least in part on the rank indication pair restriction; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting multiple CSI report configurations that include at least a first CSI report configuration and a second CSI report configuration that are associated with one or more CSI reference resources; means for determining a dependency between the first CSI report configuration and the second CSI report configuration; means for receiving at least one of a first CSI in a first CSI report for the first CSI report configuration or a second CSI in a second CSI report for the second CSI report configuration, wherein the at least one of the first CSI and the second CSI are calculated based at least in part on an assumption of a joint transmission using the one or more CSI reference resources, wherein the assumption is based at least in part on the dependency; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for determining that a first CSI report configuration and a second CSI report configuration are mutually dependent; means for transmitting an aggregate CSI report configuration that includes at least the first CSI report configuration and the second CSI report configuration that are associated with a CSI reference resource; means for receiving at least one of a first CSI for the first CSI report configuration and a second CSI for the second CSI report configuration based at least in part on an assumption of a joint transmission using the CSI reference resource, wherein the assumption is based at least in part on inclusion of the first CSI report configuration and the second CSI report configuration in the aggregate CSI report configuration and the determination that the first CSI report configuration and the second CSI report configuration are mutually dependent; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for transmitting a CSI report configuration that indicates a plurality of NZP CSI-RS resources for channel measurement or a plurality of NZP CSI-RS port-groups for channel measurement, wherein the CSI report configuration includes a rank indication pair restriction that indicates a combination of rank indications that are permitted to be reported if multiple resources of the plurality of NZP CSI-RS resources or multiple port-groups of the plurality of NZP CSI-RS port groups are selected by a UE; means for receiving CSI calculated based at least in part on an assumption of a joint transmission using multiple resources of the plurality of NZP CSI-RS resources or multiple port-groups of the plurality of NZP CSI-RS port-groups based at least in part on the rank indication pair restriction; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or t the like.

As indicated above, FIG. 2 is provided as an example. Other examples may differ from what is described with regard to FIG. 2.

Figure 3:
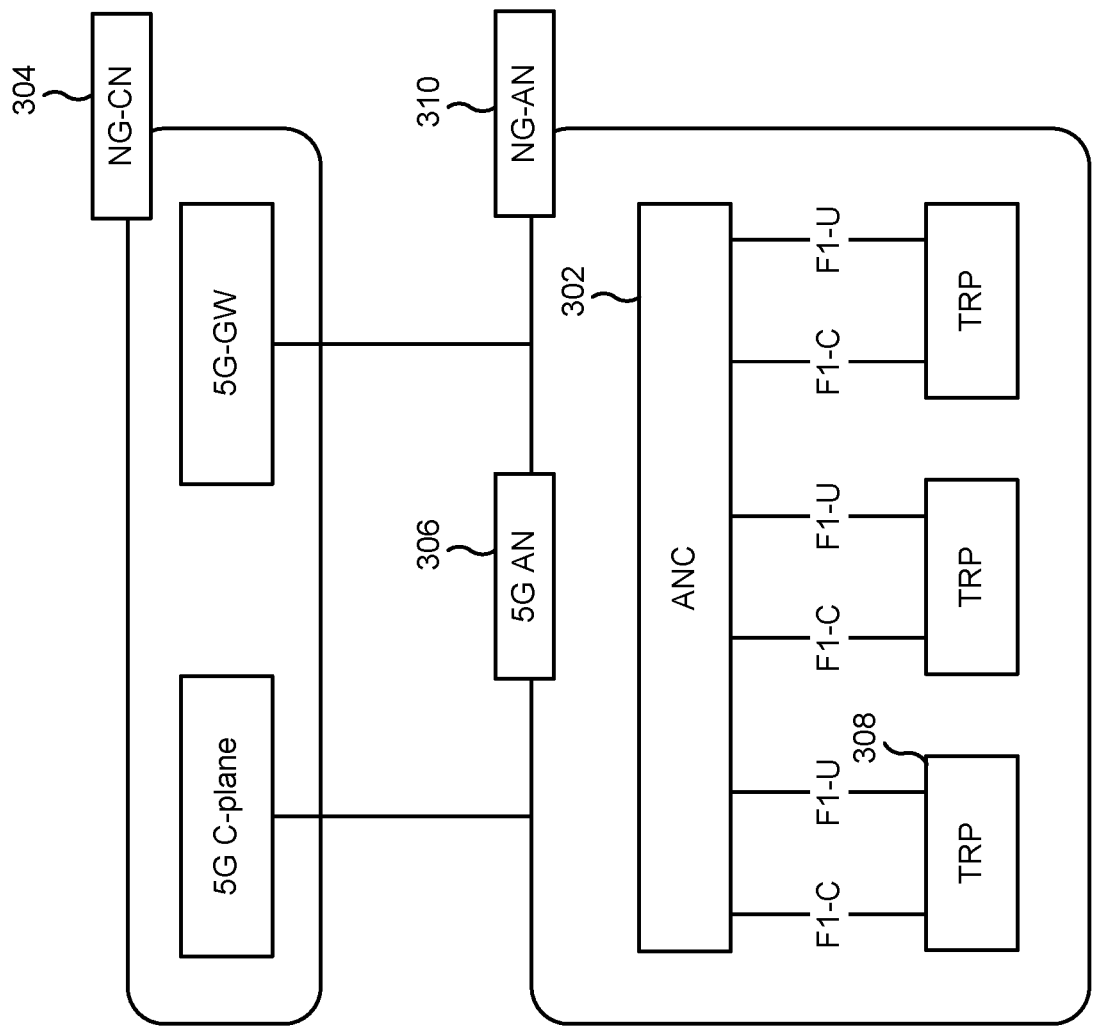
FIG. 3 illustrates an example logical architecture of a distributed radio access network (RAN), in accordance with various aspects of the present disclosure.

FIG. 3 illustrates an example logical architecture of a distributed RAN 300, according to aspects of the present disclosure.

A 5G access node 306 may include an access node controller (ANC) 302. The ANC 302 may be a central unit (CU) of the distributed RAN 300. The backhaul interface to the next generation core network (NG-CN) 304 may terminate at the ANC 302. The backhaul interface to neighboring next generation access nodes (NG-ANs) may terminate at the ANC 302. The ANC 302 may include one or more TRPs 308 (which may also be referred to as BSs, NR BSs, Node Bs, 5G NBs, APs, gNB, or some other term). A TRP 308 may be used interchangeably with "cell" and/or "panel." In some aspects, multiple TRPs 308 may be included in a single base station 110. Additionally, or alternatively, different TRPs 308 may be included in different base stations 110.

A TRP 308 may be a distributed unit (DU). A TRP 308 may be connected to a single ANC 302 or multiple ANCs 302. For example, for RAN sharing, radio as a service (RaaS), and service specific AND deployments, the TRP 308 may be connected to more than one ANC 302. A TRP 308 may include one or more antenna ports. The TRPs 308 may be configured to individually (e.g., using dynamic selection) or jointly (e.g., using joint transmission) serve traffic to a UE.

In some aspects, multiple TRPs 308 may transmit communications (e.g., the same communication or different communications) in the same TTI or different TTIs (e.g., slots, mini-slots, and/or the like) using different QCL relationships (e.g., different spatial parameters, different transmission configuration indicator (TCI) states, different precoding parameters, different beamforming parameters, and/or the like). In some aspects, a TCI state may be used to indicate one or more QCL relationships.

The local architecture of RAN 300 may be used to illustrate fronthaul definition. The architecture may be defined to support fronthauling solutions across different deployment types. For example, the architecture may be based at least in part on transmit network capabilities (e.g., bandwidth, latency, and/or jitter). The architecture may share features and/or components with LTE. According to aspects, the next generation AN (NG-AN) 310 may support dual connectivity with NR. The NG-AN 310 may share a common fronthaul for LTE and NR. The architecture may enable cooperation between and among TRPs 308. For example, cooperation may be preset within a TRP 308 and/or across TRPs 308 via the ANC 302. In some aspects, no inter-TRP interface may be needed/present.

In some aspects, a dynamic configuration of split logical functions may be present within the architecture of RAN 300. The packet data convergence protocol (PDCP), radio link control (RLC), media access control (MAC) protocol, and/or the like may be adaptably placed at the ANC 302 or TRP 308. According to various aspects, a base station 110 may include a central unit (CU) (e.g., ANC 302) and/or one or more distributed units (e.g., one or more TRPs 308).

As indicated above, FIG. 3 is provided merely as an example. Other examples may differ from what was described with regard to FIG. 3.

Figure 4:
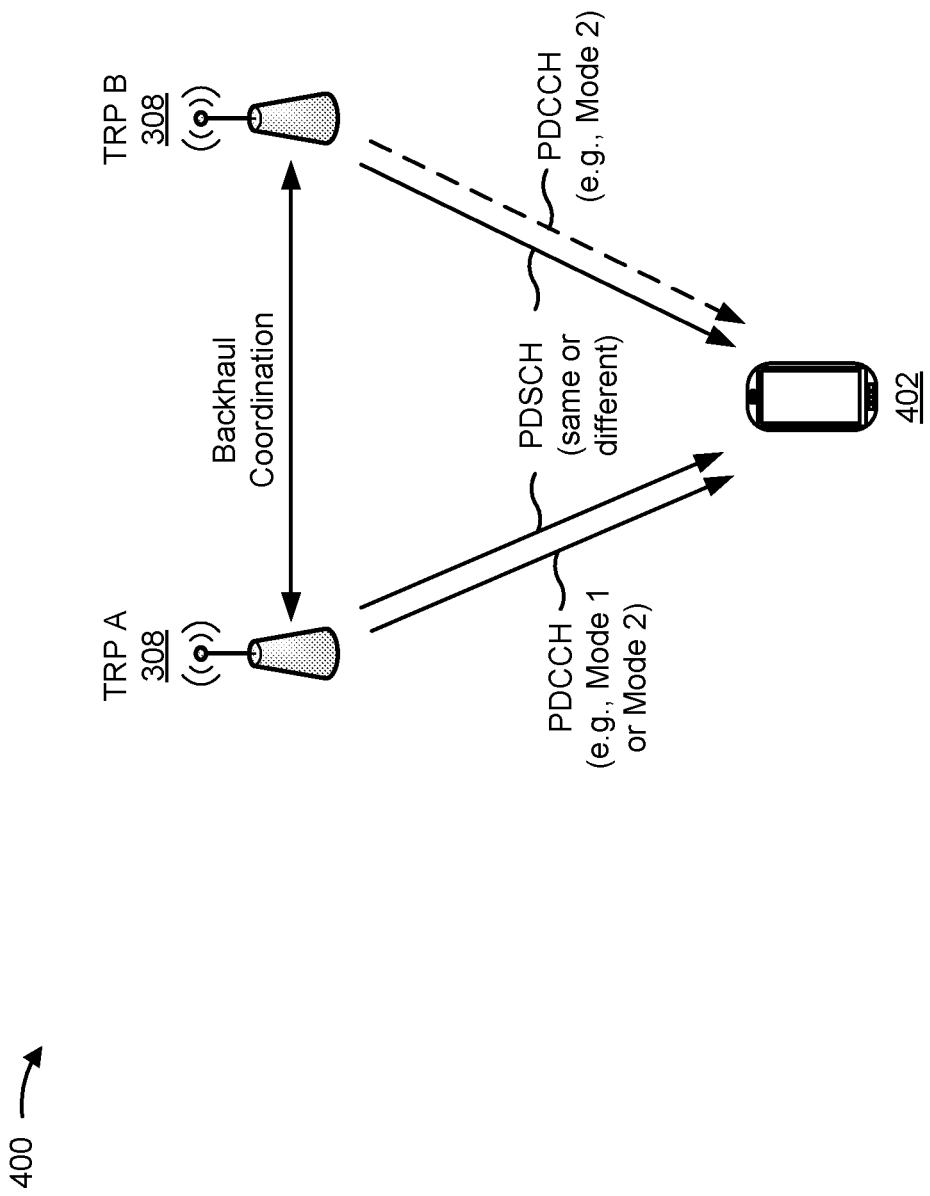
FIG. 4 is a diagram illustrating an example of multi-TRP communication, in accordance with various aspects of the present disclosure.

FIG. 4 is a diagram illustrating an example 400 of multi-TRP communication (sometimes referred to as multipanel communication), in accordance with various aspects of the present disclosure.

As shown in FIG. 4, multiple TRPs 308 (shown as TRP A and TRP B) may communicate with the same UE 402 in a coordinated manner (e.g., using coordinated multipoint transmissions and/or the like) to improve reliability, increase throughput, and/or the like. The TRPs 308 may coordinate such communications via a backhaul, which may have a smaller delay and/or higher capacity when the TRPs 308 are co-located at the same base station 110 (e.g., different antenna arrays of the same base station 110), or may have a larger delay and/or lower capacity (as compared to colocation) when the TRPs 308 are located at different base stations 110. The different TRPs 308 may communicate with the UE 402 using different QCL relationships (e.g., different TCI states), different demodulation reference signal (DMRS) ports, different layers (e.g., of a multi-layer communication), and/or the like.

In a first multi-TRP transmission mode (e.g., Mode 1), a single physical downlink control channel (PDCCH) may be used to schedule downlink data communications for a single physical downlink shared channel (PDSCH). In this case, multiple TRPs 308 (e.g., TRP A and TRP B) may transmit communications to the UE 402 on the same PDSCH. For example, a communication may be transmitted using a single codeword with different spatial layers for different TRPs 308 (e.g., where one codeword maps to a first set of layers transmitted by a first TRP 308 and maps to a second set of layers transmitted by a second TRP 308). As another example, a communication may be transmitted using multiple codewords, where different codewords are transmitted by different TRPs 308 (e.g., using different sets of layers). In either case, different TRPs 308 may use different QCL relationships (e.g., different TCI states) for different DMRS ports corresponding to different layers. For example, a first TRP 308 may use a first QCL relationship or a first TCI state for a first set of DMRS ports corresponding to a first set of layers, and a second TRP 308 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0, DCI format 1_1, and/or the like) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 308, and a second PDCCH may schedule a second codeword to be transmitted by a second TRP 308. Furthermore, first DCI (e.g., transmitted by the first TRP 308) may schedule a first PDSCH communication associated with a first set of DMRS ports with a first QCL relationship (e.g., indicated by a first TCI state) for the first TRP 308, and second DCI (e.g., transmitted by the second TRP 308) may schedule a second PDSCH communication associated with a second set of DMRS ports with a second QCL relationship (e.g., indicated by a second TCI state) for the second TRP 308. In this case, DCI (e.g., having DCI format 1_0, DCI format 1_1, and/or the like) may indicate a corresponding TCI state for a TRP 308 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 4 is provided as an example. Other examples may differ from what is described with respect to FIG. 4.

In some systems for multi-TRP communication, multiple TRPs may communicate with a UE using a transmission scheme such as a non-coherent joint-transmission (NCJT) scheme, a frequency-division multiplexing (FDM) scheme, a time-division multiplexing (TDM) scheme, and/or the like.

In an NCJT scheme (also called a spatial-division multiplexing (SDM) scheme), the UE receives communications from a first TRP via a first set of layers of a set of resources (e.g. one or more REs) and from a second TRP via a second set of layers of the set of resources. In a multi-DCI communication, the first layer and the second layer may be mapped to a first codeword and a second codeword, respectively. In a single DCI communication, the first layer and the second layer may be mapped to a single codeword. The NCJT scheme may be applied to ultra-reliable low-latency communications (URLLC) and non-URLLC.

In an FDM scheme, the UE may receive a single DCI communication to allocate resources for a downlink transmission. The single DCI communication may allocate a first set of frequency-domain resources (e.g., on a first sub-band) for the first TRP and a second set of frequency-domain resources (e.g., on a second sub-band) for the second TRP. For example, if a precoding resource block group (PRG) size is a wideband PRG size, a first half (e.g., a first range) of a total frequency domain resource allocation (FDRA) may be allocated to the first TRP and a second half (e.g., a second range) of the total FDRA may be allocated to the second TRP. If the PRG is not a wideband PRG size (e.g., 2 or 4 resource blocks), even numbered PRGs may be allocated to the first TRP and odd numbered PRGs may be allocated to the second TRP. A transmission block (TB) size may be based at least in part on all resources allocated to TRP 1 and TRP 2, with a same redundancy version (RV) mapped across all resources and layers allocated to TRP 1 and TRP 2. Alternatively, a TB size may be based at least in part on resource allocations of TRP 1 and TRP 2, individually, and a same or a different RV may be mapped to the resources and layers allocated to TRP 1 and TRP 2. The FDM scheme may be applied to URLLC.

In a TDM scheme, the UE may receive a single DCI communication to allocate resources for a downlink transmission. The single DCI communication may allocate a first set of time-domain resources (e.g., on a common frequency band) for the first TRP and a second set of time-domain resources (e.g., on the common frequency band) for the second TRP. The first set of time-domain resources and the second set of time-domain resources correspond to a first mini-slot and a second mini-slot, respectively. The first set of time-domain resources and/or the second set of time-domain resources may also correspond to one or more additional mini-slots. For example, the first set of time-domain resources may correspond to a first set of sequential mini-slots and the second set of time-domain resources may correspond to a second set of sequential mini-slots. In other examples, the first set of time-domain resources and the second set of time-domain resources may correspond to the one or more additional mini-slots with an alternating pattern (e.g., with the first set of time-domain resources corresponding to odd numbered mini-slots and with the second set of time-domain resources corresponding to even numbered mini-slots). Each mini-slot may be mapped to a same codeword with same or different RV. Additionally, or alternatively, the mini-slots may be within a single slot or may span multiple slots. The TDM scheme may be applied to URLLC.

In the transmission schemes described above, a CSI report only supports CSI reporting from one TRP. Additionally, each CSI report is self-contained with no dependency from one CSI report to another CSI report. Further, a CSI report corresponds to a single resource (e.g., associated with a single TRP) and the UE is able to choose only one TRP for the CSI report. Based at least in part on the CSI report corresponding to only one TRP, the UE may be unable to transmit CSI reports for both TRPs. Based at least in part on the UE being unable to transmit CSI reports with an assumption of a joint transmission from the first TRP and the second TRP, the first TRP and the second TRP may transmit one or more PDSCH communications using the CSI based at least in part on an assumption of a single-TRP transmission. However, using the CSI based at least in part on an assumption of a single-TRP transmission may result in inter-TRP interference (e.g., inter-layer, inter-code word interference, and/or the like) if used jointly.

In some aspects, a UE (e.g., UE 120) may be configured to transmit CSI reports for multiple TRPs. For example, the UE may receive multiple CSI report configurations that include at least a first CSI report configuration and a second CSI report configuration. The first CSI report configuration and the second CSI report configuration may be associated with one or more CSI reference resources. The UE may determine a dependency between the first CSI report configuration and the second CSI report configuration (e.g., that the second CSI report configuration depends on the first CSI report configuration, that the first CSI report configuration depends on the second CSI report configuration, that the first CSI report configuration and the second CSI report configuration are mutually dependent, and/or the like). The UE may report first CSI in a first report for the first CSI report configuration and second CSI in a second report for the second CSI report configuration.

In some examples in which the second CSI report configuration is dependent on the first CSI report configuration, the UE may calculate the second CSI based at least in part on an assumption that there is interference caused by reporting the second CSI (e.g., based at least in part on using an SDM scheme), the UE may calculate the second CSI and report the second CSI with a same rank as reported in the first CSI report, and/or the like. In some examples in which the first CSI and the second CSI are mutually dependent, the UE may calculate the second CSI based at least in part on an assumption of interference caused by reporting the first CSI (e.g., based at least in part on using an SDM scheme), the UE may calculate the second CSI and report the second CSI with a same rank as reported in the first CSI report, and/or the like. In some examples in which the first CSI and the second CSI are mutually dependent, the UE may calculate the first CSI and the second CSI jointly based at least in part on an assumption of a virtual PDSCH transmitted using a CSI reference resource with a first set of CSI-RS ports and a second set of CSI-RS ports (e.g., based at least in part on an SDM transmission scheme), the UE may calculate and report the first CSI and the second CSI with a same rank, and/or the like.

In some examples, the dependency between the first CSI report configuration and the second CSI report configuration is based at least in part on a configuration transmitted by the network. In some examples, the transmission assumption (e.g., whether there is a joint transmission considering inter-layer interference or there is a common rank reported in the first CSI and the second CSI) may depend on a transmission scheme indicated by the network.

The following examples will be discussed in the context of multi-TRP transmissions involving two TRPs; however, the techniques, devices, systems, and/or the like discussed relative to the examples below may also apply to multi-TRP transmissions involving three or more TRPs.

Figure 5:
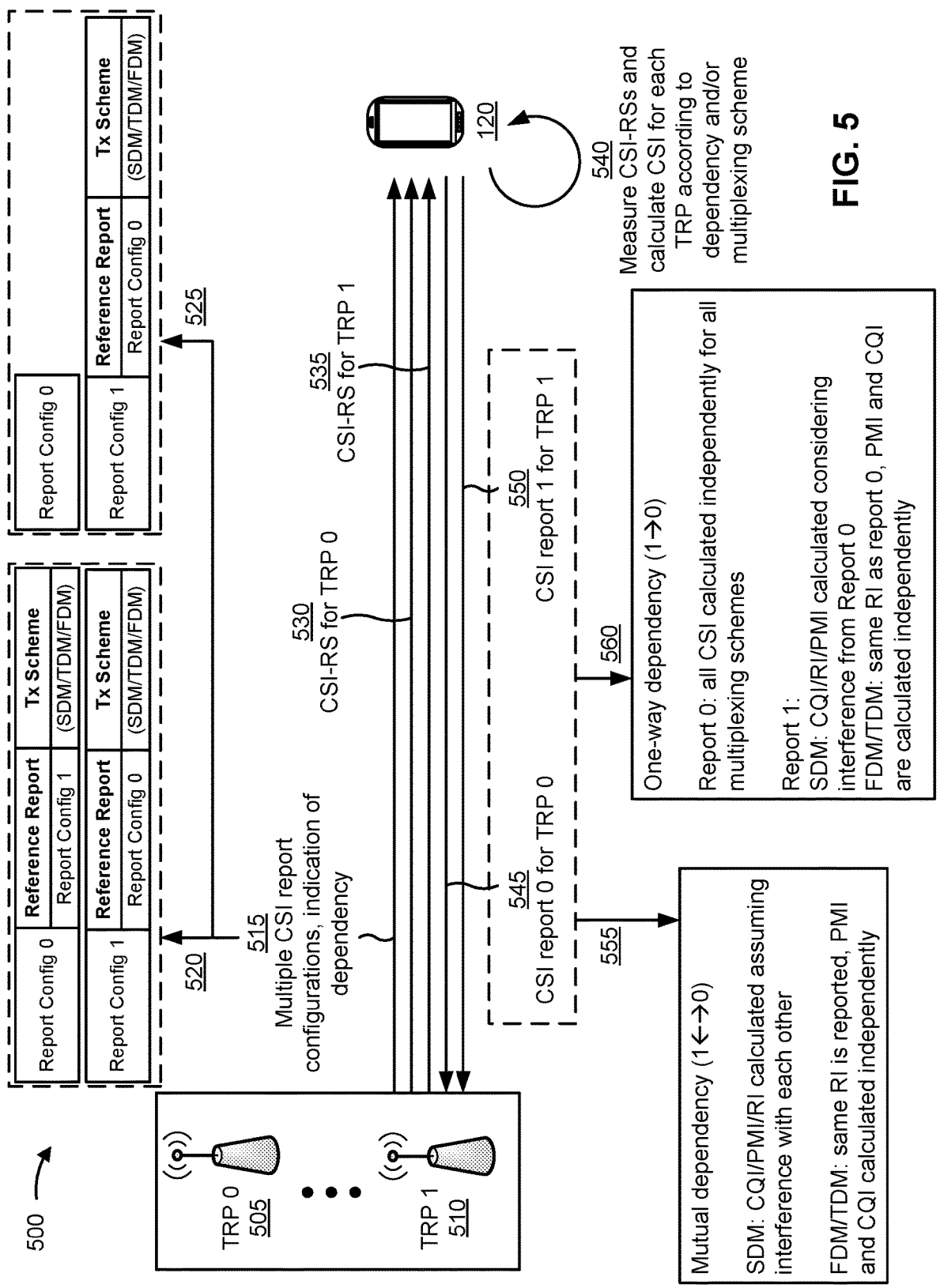
FIG. 5 is a diagram illustrating an example of correlating multiple CSI reports for multi-layer communication, in accordance with various aspects of the present disclosure.

FIG. 5 is a diagram illustrating an example 500 of correlating multiple CSI reports for multi-layer communication, in accordance with various aspects of the present disclosure. FIG. 5 shows multiple TRPs, including TRP 0 505 and TRP 1 510, communicating CSI-RSs and one or more CSI reports with UE 120.

As shown by reference number 515, UE 120 may receive multiple CSI report configurations and/or indications of dependency. The UE 120 may receive the multiple CSI report configurations and/or indications of dependency from multiple TRPs (e.g., including TRP 0 505 and TRP 1 510).

As shown by reference number 520, a first CSI report configuration communication may include a CSI report configuration 0 and a CSI report configuration 1. Each of the CSI report configurations may include a field for an indication of a reference CSI report (e.g., an indication of a CSI report configuration that corresponds to the CSI report configuration) and/or a transmission scheme (e.g., SDM, TDM, FDM, and/or the like). In some aspects, the indication of the reference report may indicate that the CSI report configuration and the reference CSI configuration are correlated with each other. In some aspects, the indication of the reference report may indicate that the CSI report configuration correlates with the reference CSI configuration.

As shown, in some aspects, the CSI report configuration 0 may indicate dependence on the CSI report configuration 1 and/or the CSI report configuration 1 may indicate dependence on CSI report configuration 0. Based at least in part on the CSI report configuration 0 indicating dependence on the CSI report configuration 1 and the CSI report configuration 1 indicating dependence on CSI report configuration 0, UE 120 may determine that the CSI report 0 and the CSI report 1 are mutually dependent.

Based at least in part on the CSI report configuration 0 and the CSI report configuration 1 being jointly dependent and associated with an SDM scheme, UE 120 may calculate the CSI for the CSI report configuration 0 and CSI report configuration 1.

In some aspects, the CSI for CSI report 0 and the CSI for CSI report 1 may be calculated based at least in part on an assumption of a joint transmission from TRP 0 505 and TRP 1 510. The calculation may include an assumption that a TRP 0 505 uses a first set of layers of resources in CSI report 0 and that TRP 1 510 uses a second set of layers of resources in CSI report 1.

In some aspects, the CSI for CSI report 0 may be calculated based at least in part on an assumption of interference from TRP 1 510 from reporting the CSI of CSI report 1. Similarly, the CSI for CSI report 1 may be calculated based at least in part on an assumption of interference from TRP 0 505 from reporting the CSI of CSI report 0.

Based at least in part on the CSI report configuration 0 and the CSI report configuration 1 being jointly dependent and associated with a TDM scheme or an FDM scheme, UE 120 may calculate the CSI for the CSI report configuration 1 jointly with calculating the CSI for the CSI report configuration 0. In some aspects, UE 120 may calculate a same RI for the CSI report configuration 0 and the CSI report configuration 1, calculate a first CQI for the CSI report configuration 0 and a second CQI for the CSI report configuration 1 independently from one another, and/or calculate a first PMI for the CSI report configuration 0 and a second PMI for the CSI report configuration 1 independently from one another. In some aspects, UE 120 may calculate and report a CSI (e.g., PMI/CQI) for the CSI of report config 1 based at least in part on an assumption that an RI for CSI report configuration 1 is the same RI as reported in CSI report configuration 0.

As shown by reference number 525, a second CSI report communication may include a CSI report configuration 1 and a CSI report configuration 0. As in the first CSI report configuration communication, CSI report configuration 1 may include a field for an indication of a reference report (e.g., an indication of a dependency on another report configuration) and/or a transmission scheme (e.g., SDM, TDM, FDM, and/or the like). The CSI report configuration 0 may not include a field for an indication of a reference report and/or a transmission scheme. CSI report configuration 0 and/or CSI report configuration 1 may indicate additional configuration parameters, such as an associated CSI-RS resource setting, a codebook configuration, a reporting band, and/or the like.

In some aspects, the CSI report configuration 1 may indicate dependence on the CSI report configuration 0. Based at least in part on the CSI report configuration 1 indicating dependence on the CSI report configuration 0 and a configuration of UE 120, UE 120 may determine that the CSI report 0 and the CSI report 1 are mutually dependent or that the CSI report 1 has a one-way dependency on the CSI report 0. In some aspects, the CSI report 1 may be calculated based at least on an assumption of a joint transmission from a different TRP than a TRP that transmitted the CSI report configuration 1. In some aspects, the CSI report 1 may be calculated based at least in part on an assumption of interference from the different TRP using CSI reported in CSI report 0.

As shown by reference number 530, UE 120 may receive a CSI-RS for TRP 0 505 of the multiple TRPs (e.g., from TRP 0 505). As shown by reference number 535, UE 120 may also receive a CSI-RS for TRP 1 510 of the multiple TRPs (e.g., from TRP 1 510). The CSI-RS for TRP 0 505 and the CSI-RS for TRP 1 510 may be associated with different CSI-RS resources, different CSI-RS resource sets, different CSI-RS port groups, different CSI-RS resource settings, different CSI-RS resource groups, and/or the like.

As shown reference number 540, UE 120 may measure CSI-RSs and calculate CSI for each TRP according to an indicated dependency and/or an indicated multiplexing scheme. For example, the calculated CSI may indicate CQI, PMI, RI and/or the like for each TRP.

Based at least in part on the CSI report configuration 0 and the CSI report configuration 1 being jointly dependent and associated with an SDM scheme, UE 120 may calculate the CSI for the CSI report configuration 1. In some aspects, the CSI report 1 may be calculated based at least on an assumption of a joint transmission from a different TRP than a TRP that transmitted the CSI report configuration 1. In some aspects, the CSI report 1 may be calculated based at least in part on an assumption of interference from the different TRP using CSI reported in CSI report 0.

Based at least in part on the CSI report configuration 0 and the CSI report configuration 1 being jointly dependent and associated with a TDM scheme or an FDM scheme, UE 120 may calculate the CSI for the CSI report configuration 1 jointly with calculating the CSI for the CSI report configuration 0. In some aspects, UE 120 may calculate a same RI for the CSI report configuration 0 and the CSI report configuration 1, calculate a first CQI for the CSI report configuration 0 and a second CQI for the CSI report configuration 1 independently from one another, and/or calculate a first PMI for the CSI report configuration 0 and a second PMI for the CSI report configuration 1 independently from one another. In some aspects, UE 120 may calculate and report a CSI (e.g., PMI/CQI) for the CSI of report config 1 based at least in part on an assumption that an RI for CSI report configuration 1 is the same RI as reported in CSI report configuration 0.

Based at least in part on the CSI report configuration 0 being independent from the CSI report configuration 1 and the CSI report configuration 1 being dependent on CSI report configuration 0, UE 120 may calculate the CSI for the CSI report configuration 0 independently from calculating the CSI for the CSI report configuration 1. In some aspects, UE 120 may calculate the CSI for the CSI report configuration 1 based at least in part on calculating the CSI for the CSI report configuration 0.

In some aspects in which the CSI report configuration 0 and the CSI report configuration 1 are associated with an SDM scheme and the CSI report configuration 0 being independent from the CSI report configuration 1, UE 120 may calculate the CSI for the CSI report configuration 1 accounting for interference associated with the CSI report configuration 0 when calculating a CQI, a PMI, an RI, and/or the like for the CSI report configuration 1.

In some aspects in which the CSI report configuration 0 and the CSI report configuration 1 are associated with a TDM or an FDM scheme and the CSI report configuration 0 is independent from the CSI report configuration 1, UE 120 may calculate the CSI for the CSI report configuration 1 based at least in part on the calculation of the CSI for the CSI report configuration 0. In some aspects, UE 120 may use a same RI, calculated for the CSI report configuration 0, for the CSI report configuration 1. In some aspects, UE 120 may calculate a second CQI and/or PMI for the CSI report configuration 1 independently from a first CQI and/or PMI calculated for the CSI report configuration 0.

As shown by reference number 545, UE 120 may transmit a CSI report 0 for TRP 0 505. As shown by reference number 550, UE 120 may transmit a CSI report 1 for TRP 1 510.

As shown by reference number 555, the CSI report 0 and the CSI report 1 may be calculated jointly based at least in part on mutual dependency between the CSI-RS 0 and CSI-RS 1, as indicated in the multiple CSI report configurations. In some aspects, based at least in part on using an SDM transmission scheme, a CQI, a PMI, an RI, and/or the like may be calculated assuming interference with each other (e.g., by accounting for cross-layer interference). In some aspects, based at least in part on using an SDM transmission scheme, a CQI, a PMI, an RI and/or the like may be calculated based at least in part on an assumption of a joint transmission using CSI reference resources associated with CSI report configuration 0 and CSI report configuration 1. In some aspects, based at least in part on using an FDM or TDM transmission scheme, a same RI may be reported for both TRPs, a PMI may be calculated independently, and a CQI may be calculated independently.

As shown by reference number 560, the CSI report 0 and CSI report 1 may be calculated based at least in part on one-way dependency where the CSI-RS 1 is dependent on the CSI-RS 0, as indicated in the multiple CSI report configurations. In other words, the CSI for the second CSI report configuration may be based at least in part on calculating CSI for the first CSI report configuration. In some aspects, CQI, RI, PMI, and/or the like for the CSI report 0 may be calculated independently whether using an SDM, FDM, or TDM transmission scheme (e.g., because CSI report 0 is not dependent on CSI report 1). In some aspects, CQI, RI, PMI, and/or the like for the CSI report 1 may be calculated considering interference from the CSI report 0, based at least in part on using an SDM transmission scheme. In some aspects, CQI, RI, PMI, and/or the like for the CSI report 1 may be calculated with an RI being the same as the RI of CSI report 0, PMI calculated independently, and CQI calculated independently.

As indicated above, FIG. 5 is provided as an example. Other examples may differ from what is described with respect to FIG. 5.

Figure 6:
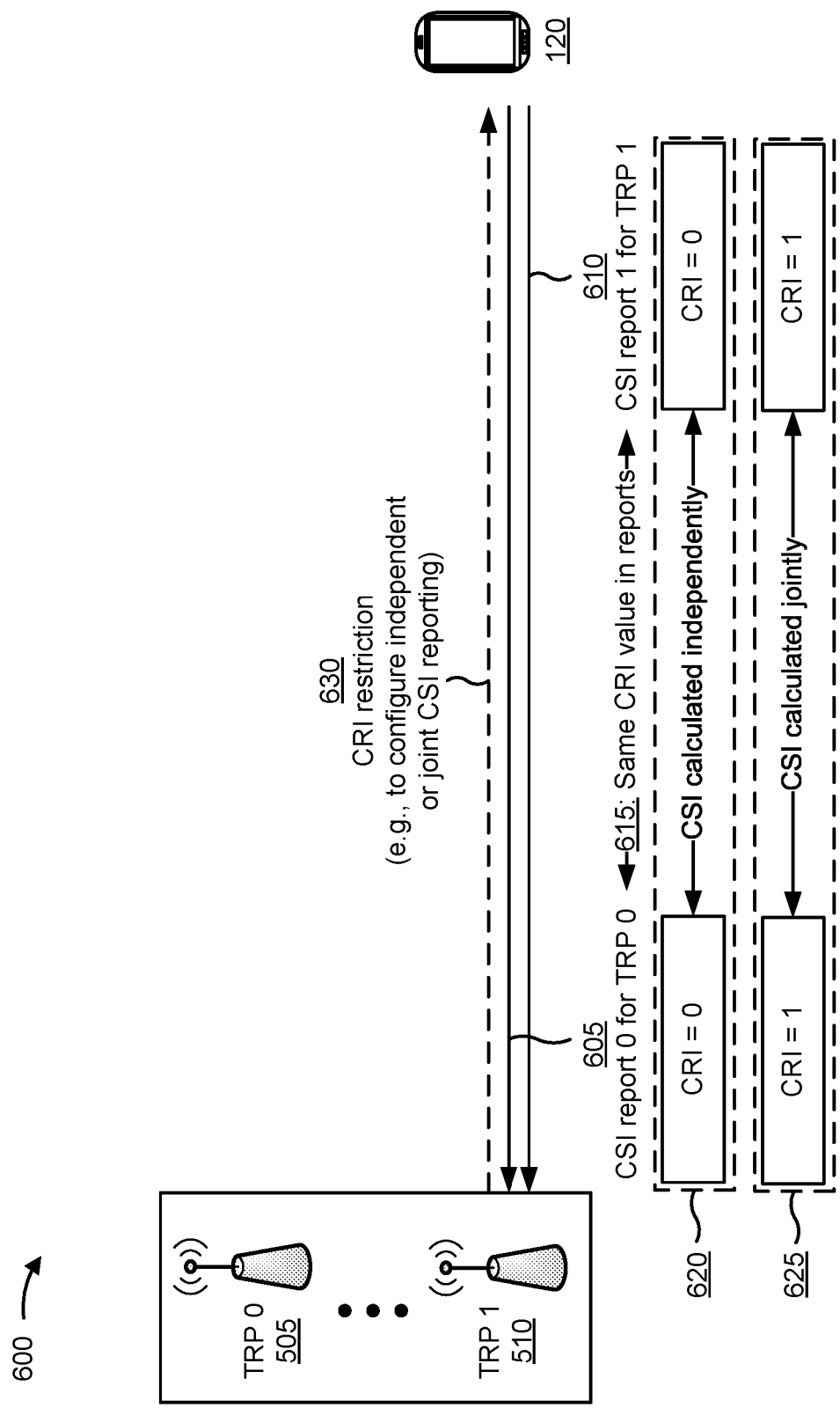
FIG. 6 is a diagram illustrating an example of correlating multiple CSI reports for multi-layer communication, in accordance with various aspects of the present disclosure.

FIG. 6 is a diagram illustrating an example 600 of correlating multiple CSI reports for multi-layer communication, in accordance with various aspects of the present disclosure.

As shown in FIG. 6, and by reference number 605, UE 120 may transmit a CSI report 0 for TRP 0. In some aspects, the CSI report 0 may include a first CSI reference signal (CSI-RS) resource indicator (CRI).

As shown by reference number 610, UE 120 may transmit a CSI report 1 for TRP 1. In some aspects, the CSI report 1 may include a second CRI. In some aspects, the first CRI and the second CRI have a same value.

As shown by reference number 615, the CSI report 0 and the CSI report 1 may have a same CRI value.

As shown by reference number 620, a value of the CRI of the CSI report 0 and a value of the CSI report 1 may indicate that the CSI for the CSI report configuration 1 and the CSI for the CSI report configuration 0 are calculated independently. For example, the CSI report 0 and the CSI report 1 may include a same CRI value of 0 (zero) to indicate that the CSI for the CSI report configuration 1 and the CSI for the CSI report configuration 0 are calculated independently.

As shown by reference number 625, another value of the CRI of the CSI report 0 and the CSI report 1 may indicate that the CSI for the CSI report configuration 1 and the CSI for the CSI report configuration 0 are calculated jointly. For example, the CSI report 0 and the CSI report 1 may include a same CRI value of 1 to indicate that the CSI for the CSI report configuration 1 and the CSI for the CSI report configuration 0 are calculated jointly.

As shown by reference number 630, UE 120 may receive an indication of a CRI restriction that configures UE 120 to report only joint CSI or only independent CSI. In some aspects, UE 120 may receive the CRI restriction via radio resource control (RRC) signaling, a DCI communication, and/or the like. In some aspects, UE 120 may receive the indication of the CRI restriction before transmitting the CSI report 0 and/or the CSI report 1.

As indicated above, FIG. 6 is provided as an example. Other examples may differ from what is described with respect to FIG. 6.

Figure 7:
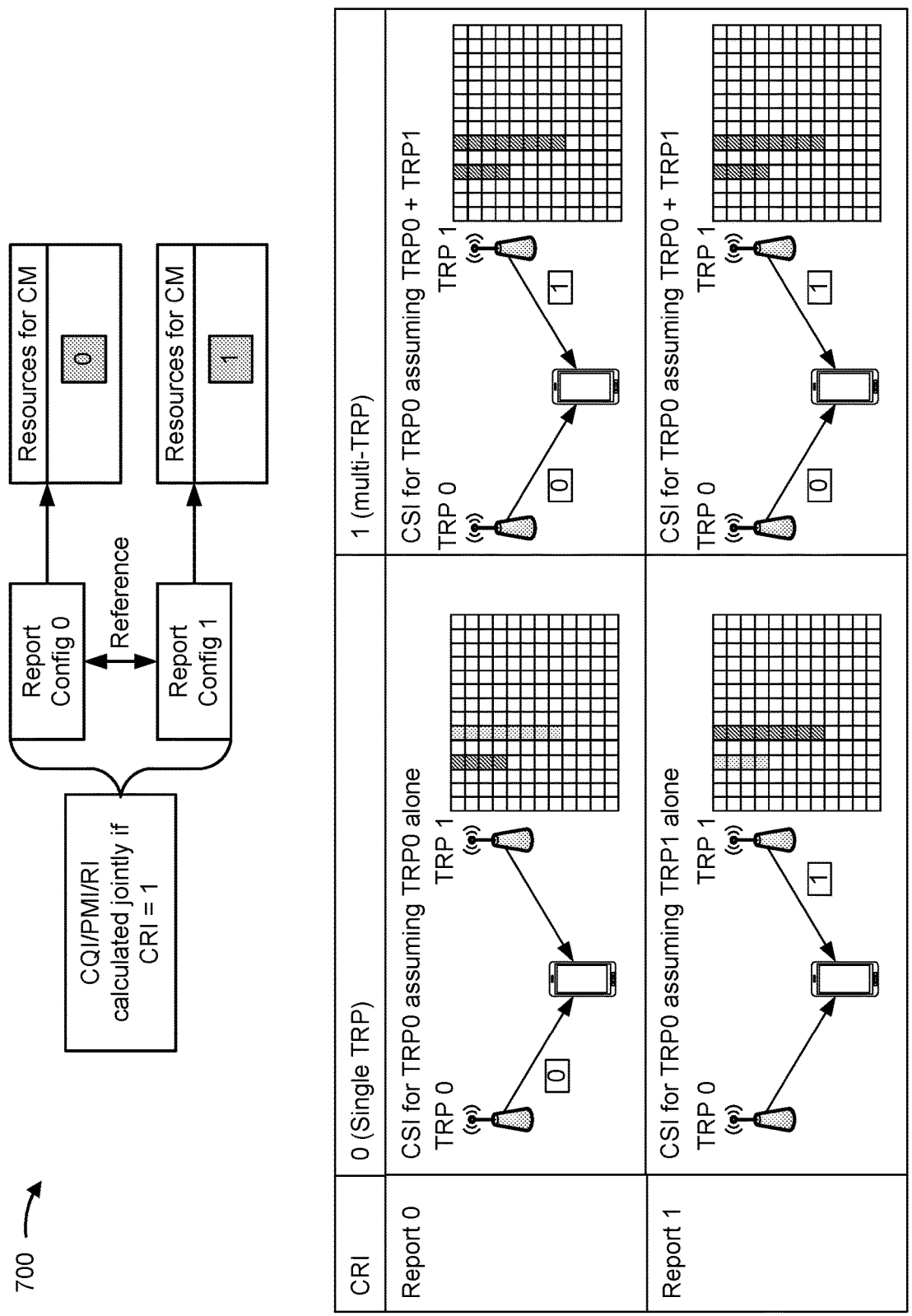
FIG. 7 is a diagram illustrating an example of correlating multiple CSI reports for multi-layer communication, in accordance with various aspects of the present disclosure.

FIG. 7 is a diagram illustrating an example 700 of correlating multiple CSI reports for multi-layer communication, in accordance with various aspects of the present disclosure.

As shown in example 700, the CSI report 0 is associated with a single resource (e.g., a first set of REs) and the CSI report 1 is associated with a different single resource (e.g., a second set of REs). Each of the single resources correspond to a single (e.g., different) TRP. In some aspects, the CSI report 0 and the CSI report 1 may report a same CRI to indicate whether the reported CSI is a joint CSI with NCJT or independent CSI for each TRP. The grids shown in example 700 illustrate CSI-RS patterns within a frequency domain and a time domain. For example, the x-axis may correspond to the time domain and the y-axis may correspond to a frequency domain. In some aspects, the example 700 may relate to frequency range 1 (FR1) frequency band communications.

In some aspects, TRP 0 may have a first quantity of ports (e.g., 4 ports) and occupy a corresponding first quantity of REs (e.g., 4 REs shown in the grid during a fourth symbol) TRP 1 may have a second quantity of ports (e.g., 8 ports) and occupy a corresponding second quantity of REs (e.g., 8 REs shown in the grid during a sixth symbol).

If the CRI indicates that the CSIs are calculated independently (e.g., CSI=0), CSI report 0 may be associated with the REs occupied by TRP 0 and CSI report 1 may be associated with the REs occupied by TRP 1. If the CRI indicates that the CSIs are calculated jointly (e.g., CSI=1), CSI report 0 may be associated with the REs occupied by TRP 0 and CSI report 1 may be associated with the REs occupied by TRP 0 and TRP 1, with an assumption that there is a joint transmission from TRP 0 and TRP 1, and/or with an assumption that there is interference coming from TRP 1 and TRP 0 using the calculated CSI.

As indicated above, FIG. 7 is provided as an example. Other examples may differ from what is described with respect to FIG. 7.

Figure 8:
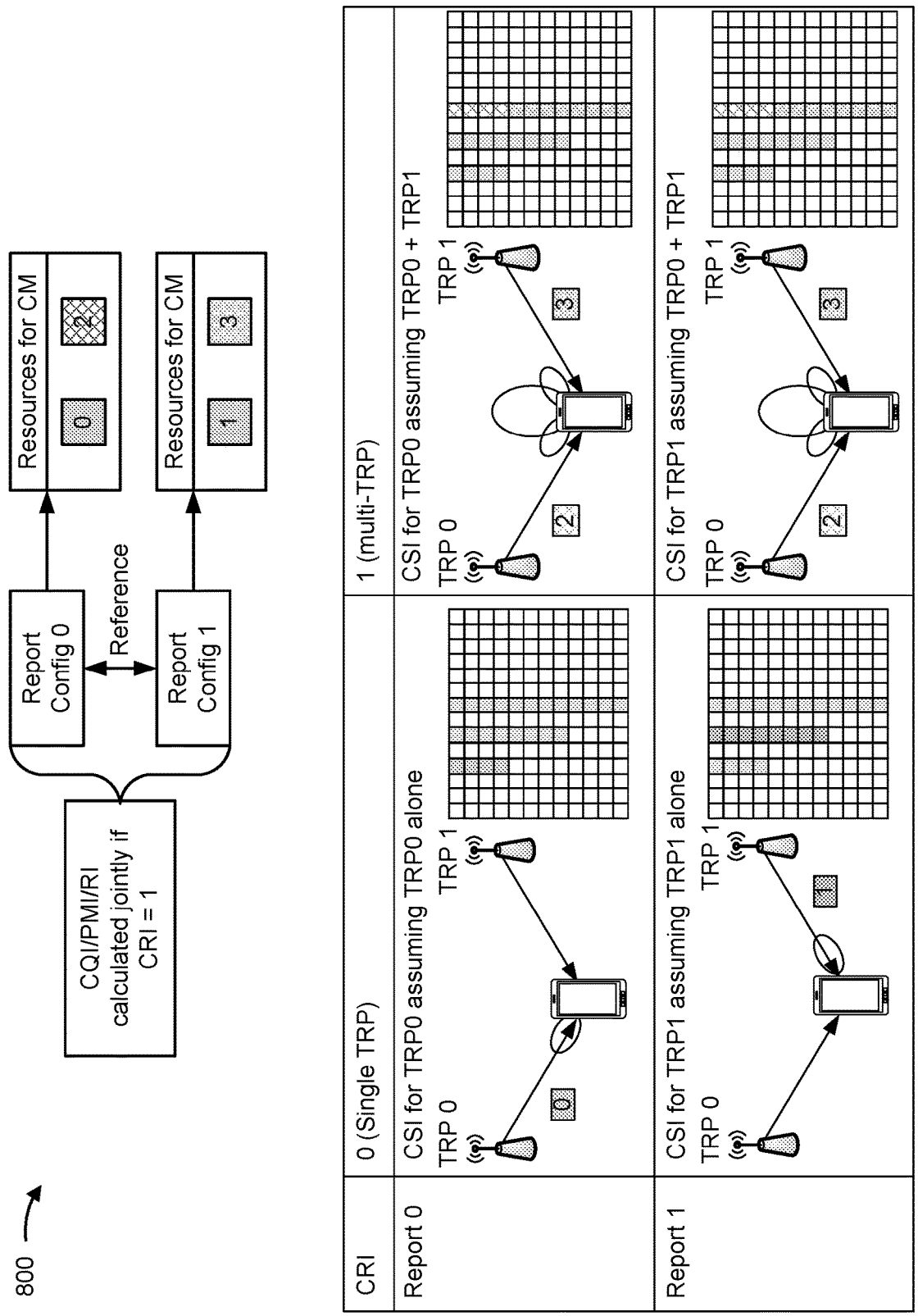
FIG. 8 is a diagram illustrating an example of correlating multiple CSI reports for multi-layer communication, in accordance with various aspects of the present disclosure.

FIG. 8 is a diagram illustrating an example 800 of correlating multiple CSI reports for multi-layer communication, in accordance with various aspects of the present disclosure.

As shown in example 800, the CSI report 0 is associated with a pair of resources and the CSI report 2 is associated with a different pair of resources. Each of the pairs of resources correspond to a single (e.g., different) TRP. In some aspects, the CSI report 0 and the CSI report 1 may report a same CRI to indicate whether the reported CSI is a joint CSI with NCJT or independent CSI for each TRP. The grids shown in example 800 illustrate CSI-RS patterns. In some aspects, the example 800 may relate to frequency range 2 (FR2) frequency band communications.

In some aspects, TRP 0 may have a first quantity of ports (e.g., 4 ports) and occupy a corresponding first quantity of REs (e.g., 4 REs shown in the grid during a fourth symbol or 4 REs shown in an eighth symbol) TRP 1 may have a second quantity of ports (e.g., 8 ports) and occupy a corresponding second quantity of REs (e.g., 8 REs shown in the grid during a sixth symbol or 8 REs shown in the eight symbol with the REs of TRP 0).

In some aspects, if the CRI indicates that the CSIs are calculated independently (e.g., CSI=0), CSI report 0 may be associated with a first resource of the pair of resources occupied by TRP 0 and CSI report 1 may be associated with a first resource of the pair of resources occupied by TRP 1. If the CRI indicates that the CSIs are calculated jointly (e.g., CSI=1), CSI report 0 may be associated with a second resource of the pair of resources occupied by TRP 0 and CSI report 1 may be associated with a second resource of the pair of resources occupied by TRP 1, with an assumption that there is a joint transmission from TRP 0 and TRP 1, and/or with an assumption that there is interference coming from TRP 1 and TRP 0 using the calculated CSI.

In some aspects, the second resource of the pair of resources occupied by TRP 0 and the second resource of the pair of resources occupied by TRP 1 may be located on a same symbol in the time domain (e.g., based at least in part on being in an SDM transmission mode (e.g., for NCJT measurement) and UE 120 using a single Rx beam to receive the CSI-RS of TRP 0 and TRP 1 simultaneously).

As indicated above, FIG. 8 is provided as an example. Other examples may differ from what is described with respect to FIG. 8.

Figure 9:
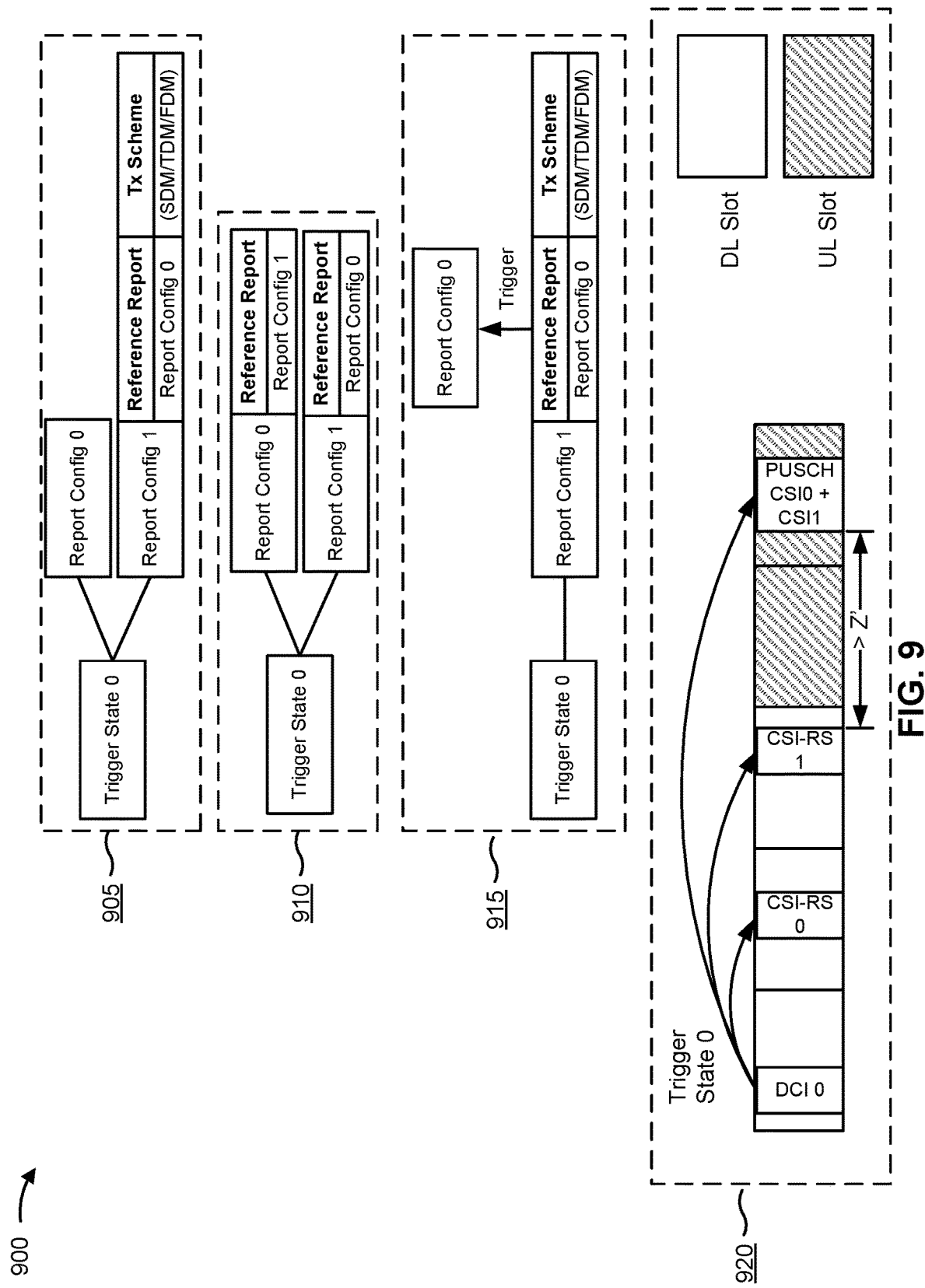
FIG. 9 is a diagram illustrating an example of correlating multiple CSI reports for multi-layer communication, in accordance with various aspects of the present disclosure.

FIG. 9 is a diagram illustrating an example 900 of correlating multiple CSI reports for multi-layer communication, in accordance with various aspects of the present disclosure. As shown in example 900, the CSI report 0 and the CSI report 1 may be put in the same trigger state, so as to be triggered simultaneously (e.g., by a DCI communication). In some aspects, the CSI report may be scheduled for transmission on a PUSCH (e.g., an aperiodic CSI report and/or semi-persistent CSI report triggered by DCI).

As shown in FIG. 9, and by reference number 905, CSI report configuration 1 identifies CSI report configuration 0 as a reference CSI report configuration. In some aspects, based at least in part on CSI report configuration 0 being identified as a reference CSI report configuration, CSI report configuration 1 may be put into a triggered state based at least in part on CSI report configuration 0 being in a triggered state (e.g., by UE 120 receiving a CSI request that triggers a trigger state for CSI report configuration 0). In other words, the CSI report 0 and the CSI report 1 may both be triggered based at least in part on receiving an indication in the DCI that triggers the CSI report 1.

As shown by reference number 910, CSI report configuration 1 identifies CSI report configuration 0 as a reference CSI report configuration. Additionally, CSI report configuration 0 identifies CSI report configuration 1 as a reference CSI report. In some aspects, based at least in part on CSI report configuration 0 being identified as a reference CSI report configuration for CSI report configuration 1, and based at least in part on CSI report configuration 1 being identified as a reference CSI report configuration for CSI report configuration 0, if either CSI report configuration enters a triggered state, the other CSI report configuration will enter a triggered state. In other words, the CSI report 0 and the CSI report 1 may both be triggered based at least in part on receiving an indication in the DCI that triggers the CSI report 1 or the CSI report 0.

As shown by reference number 915, if CSI report configuration 1 is triggered (e.g., CSI report 1 is triggered), CSI report configuration 0, which is identified as a reference CSI report configuration, may also be triggered. In some aspects, CSI report configuration 0 and CSI report configuration 1 may not be in a same trigger state.

As shown by reference number 920, UE 120 may receive a CSI request in a DCI communication that triggers a trigger state for the CSI report configuration 0 or the CSI report configuration 1. In some aspects, UE 120 may use a technique described relative to reference numbers 905, 910, or 915 to trigger the CSI report configuration 0 (e.g., to transmit the CSI report 0) and the CSI report configuration 1 (e.g., to transmit the CSI report 1). In some aspects, CSI-RS resources for a CSI-RS associated with CSI report 0 may be in a different slot than CSI-RS resources for a CSI-RS associated with CSI report 1. In some aspects, UE 120 may transmit CSI report 0 and CSI report 1 in a same slot and/or using a same PUSCH transmission.

As shown in example 900, the CSI report 0 and the CSI report 1 may be transmitted during a same time (e.g., during a same PUSCH slot and/or symbol) based at least in part on being triggered by a same UL grant. In some aspects, UE 120 may receive CSI-RS 0 and CSI-RS 1 during different slots and/or different symbols and the transmission of the CSI report 0 and the CSI report 1 may be transmitted during a same set of time-domain resources.

As indicated above, FIG. 9 is provided as an example. Other examples may differ from what is described with respect to FIG. 9.

Figure 10:
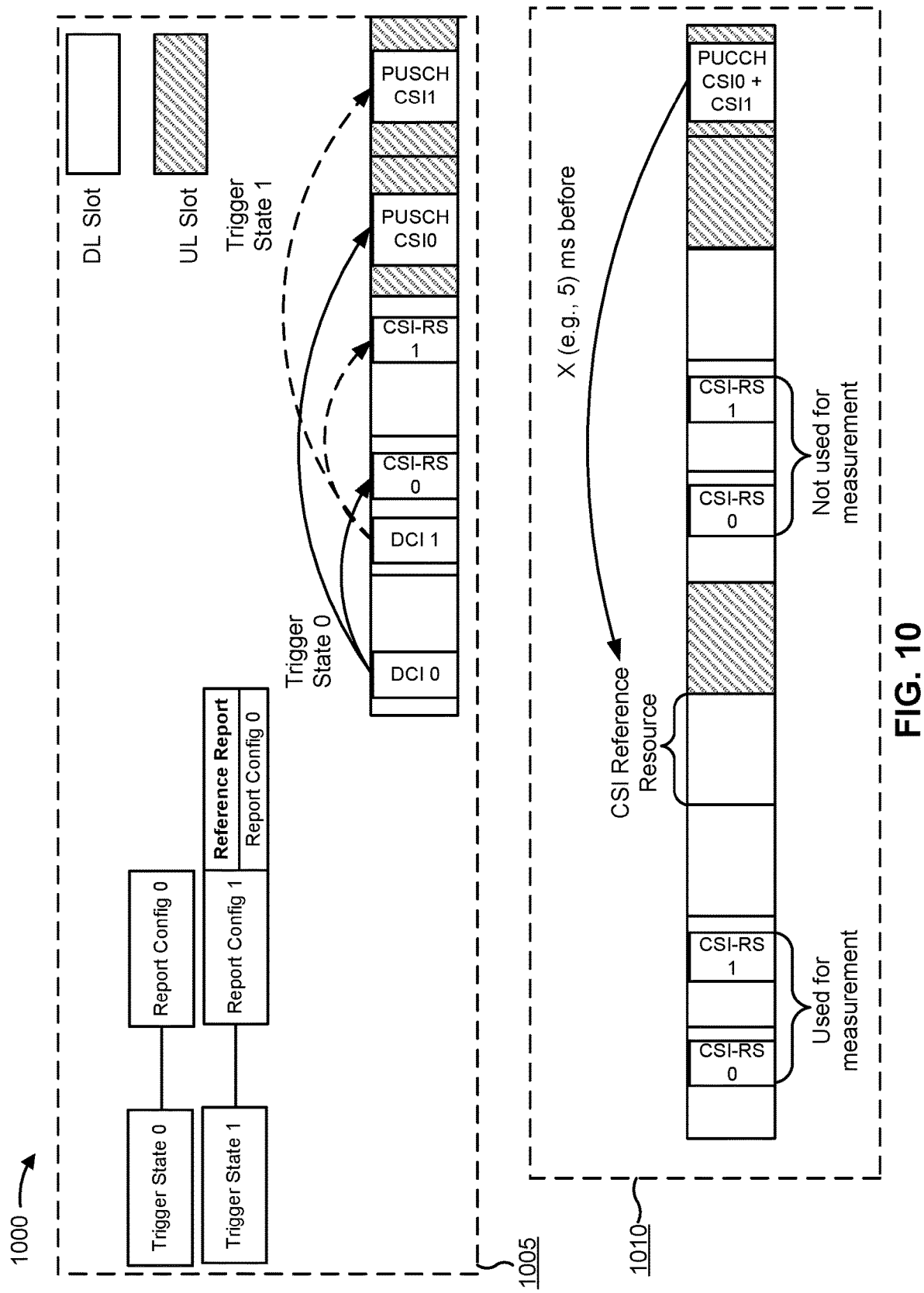
FIG. 10 is a diagram illustrating an example of correlating multiple CSI reports for multi-layer communication, in accordance with various aspects of the present disclosure.

FIG. 10 is a diagram illustrating an example 1000 of correlating multiple CSI reports for multi-layer communication, in accordance with various aspects of the present disclosure.

As shown in FIG. 10, and by reference number 1005, the CSI report 1 may be triggered at a time that is later than a time at which the CSI report 0 is triggered. In some aspects, first DCI (e.g., including trigger state 0) triggers the CSI report 0 and second DCI (e.g., including trigger state 1) triggers the CSI report 1. The second DCI may indicate a reference CSI report as the CSI report 0. In some aspects, based at least in part on the second DCI, CSI report 1 may not be triggered before CSI report 0. In some aspects, an offset between first DCI, that triggers the CSI report 0, and second DCI, that triggers the CSI report 1, does not satisfy a threshold (e.g., the offset is less than or equal to the threshold). The threshold may be based at least in part on capabilities of the UE or may be fixed (e.g., 1 slot).

In some aspects, a set of CSI-RS 1 resources, measured for the CSI report 1, occur or begin at a same time as or later than a set of CSI-RS 0 resources, measured for the CSI report 0, with an offset between the set of CSI-RS 0 resources and the second set of CSI-RS 1 resources that does not satisfy a threshold (e.g., the offset is less than or equal to the threshold). The threshold may be based at least in part on capabilities of the UE or may be fixed (e.g., 1 slot).

In some aspects, UE 120 may determine that the CSI report 0 and the CSI report 1 are PUCCH-based CSI reports (e.g., periodic CSI reports or semi-persistent CSI reports) that may be triggered by periodic CSI and/or a MAC control element (CE). In some aspects, a slot offset between a transmission occasion of the CSI report 0 and a transmission occasion of the CSI report 1 may be less than or equal to a threshold. In other words, CSI report 0 may be transmitted in slots n, n+$T_0$, n+$2T_0$, n+$3T_0$, etc. and CSI report 1 may be transmitted in slots m, m+$T_1$, m+$2T_1$, m+$3T_1$, etc. In some aspects, a periodicity of the CSI report 0 and a periodicity of the CSI report 1 may be a same periodicity (e.g., $T_0=T_1$). In some aspects, a difference between n and m may satisfy (e.g., be less than) a threshold number of slots.

As shown by reference number 1010, periodic CSI and/or semi-persistent CSI may be transmitted via the CSI report 0 and the CSI report 1 using a same PUCCH resource with a same slot offset. In some aspects, any CSI-RS resources between the CSI reference resource and the PUCCH may not be used for measurements associated with the CSI report 0 and the CSI report 1. In some aspects, a CSI reference resource for periodic CSI may be defined as 4 milliseconds before the PUSCH resource for transmitting the CSI report 0 and the CSI report 1. In some aspects, the CSI reference resource for semi-persistent CSI may be defined as 5 millisecond before the PUSCH resource for transmitting the CSI report 0 and the CSI report 1. In this way, UE 120 may determine which CSI resources to measure for the CSI report 0 and the CSI report 1 (e.g., CSI resources that are before the CSI reference resources).

the CSI report 0 and the CSI report 1 may be transmitted in a same PUSCH resource and/or configured with a same slot offset from a CSI reference resource. For example, UE 120 may transmit the CSI report 0 and the CSI report 1 in a PUSCH resource that is a period of time (e.g., 5 milliseconds) after a CSI reference resource.

As indicated above, FIG. 10 is provided as an example. Other examples may differ from what is described with respect to FIG. 10.

Figure 11:
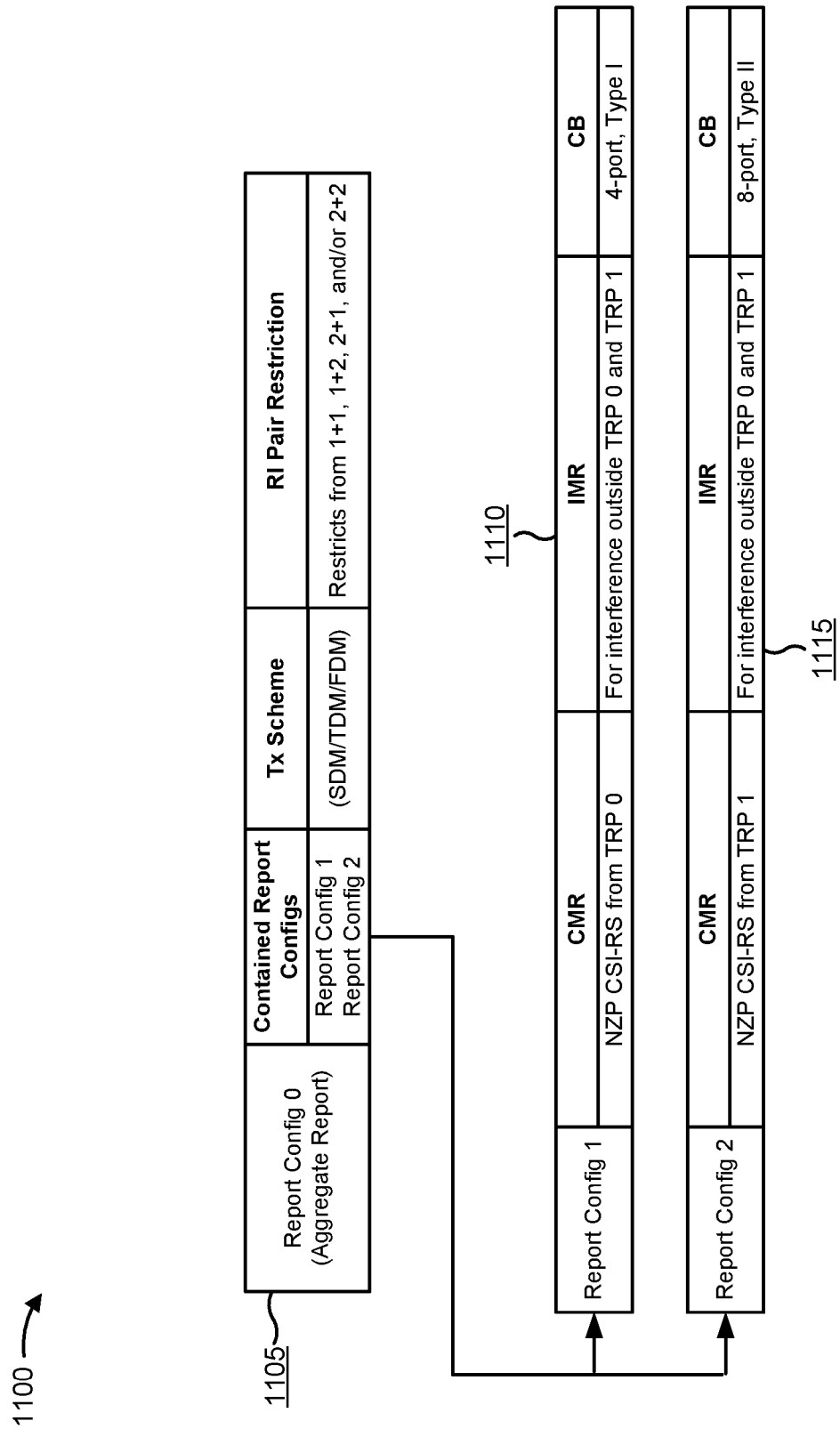
FIG. 11 is a diagram illustrating an example of correlating multiple CSI reports for multi-layer communication, in accordance with various aspects of the present disclosure.

FIG. 11 is a diagram illustrating an example 1100 of correlating multiple CSI reports for multi-layer communication, in accordance with various aspects of the present disclosure.

As shown in FIG. 11, and by reference number 1105, UE 120 may receive an aggregate CSI report configuration (e.g., a mega CSI report configuration) that includes a first CSI report configuration and a second CSI report configuration. In some aspects, the second CSI report configuration may depend on the first CSI report configuration. In some aspects, the first CSI report configuration and the second CSI report configuration may be mutually dependent. The aggregate CSI report configuration may include indications of a set of CSI report configurations (e.g., including the first CSI report configuration and the second CSI report configuration), a transmission scheme, a RI pair restriction, and/or the like.

In some aspects, the RI pair restriction indicates one or more combinations of rank indications that are permitted to be included in a first CSI report, associated with the first CSI report configuration, and included in a second CSI report associated with the second CSI report configuration. In some aspects, a multiplexing scheme may be implicitly indicated by the RI pair restriction. For example, for an RI pair restriction that only allows RI pairs with the same rank, UE 120 may determine that the transmission scheme is FDM or TDM. This may be based at least in part on the FDM and TDM transmission schemes using RI pairs with the same rank based at least in part on the FDM and TDM transmission schemes allowing only a single codeword. For an RI pair restriction that allows RI pairs with different ranks, UE 120 may determine that the transmission scheme is SDM.

In some aspects, the first CSI report configuration and the second CSI report configuration may be communicated to UE 120 based at least in part on RRC signaling. The aggregate CSI report configuration may include one or more indicators that map to the first CSI report configuration and/or the second CSI report configuration.

As shown by reference numbers 1110 and 115, the first CSI report configuration and the second CSI report configuration may indicate respective channel measurement resources (CMR), interference measurement resources (IMR), and/or codebook configurations (e.g., numbers of ports, codebook types, codebook subset restrictions, and/or the like).

As indicated above, FIG. 11 is provided as an example. Other examples may differ from what is described with respect to FIG. 11.

Figure 12:
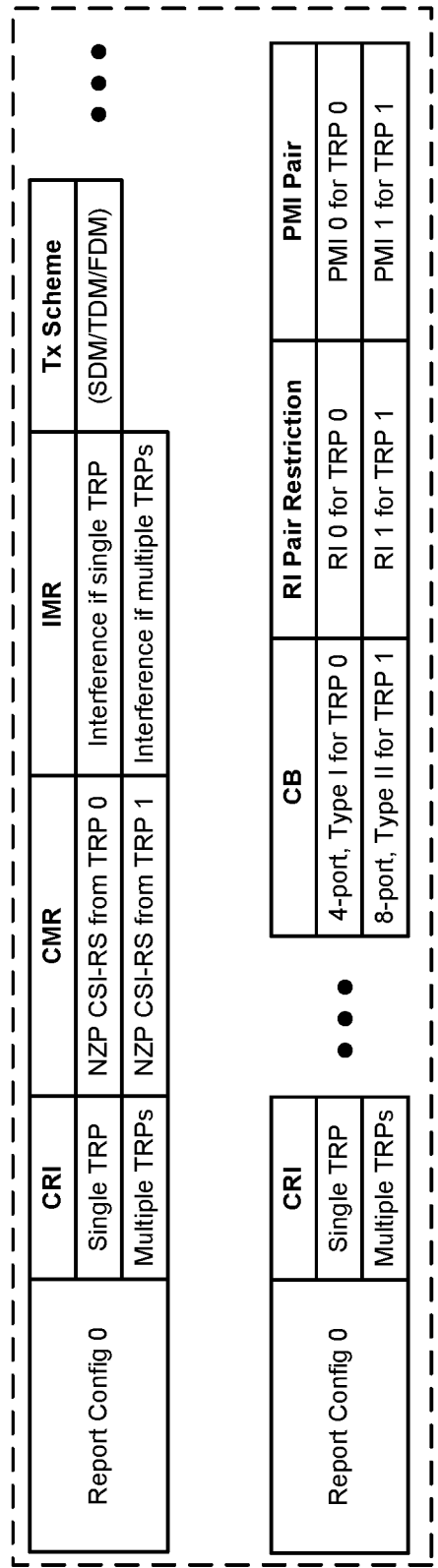
FIG. 12 is a diagram illustrating an example of correlating multiple CSI reports for multi-layer communication, in accordance with various aspects of the present disclosure.

FIG. 12 is a diagram illustrating an example 1200 of correlating multiple CSI reports for multi-layer communication, in accordance with various aspects of the present disclosure.

As shown by example 1200, a UE may receive a CSI report configuration that indicates a first set of CSI parameters for calculating CSI for a single TRP mode and a second set of CSI parameters for calculating CSI for a multi-TRP mode. In some aspects, the CSI report configuration may indicate a CRI value associated with the single TRP mode (e.g., CRI value 0 means TRP 0; CRI value 1 means TRP 1) or the multi-TRP mode (e.g., CRI value 2 means TRP 0 and TRP 1). In some aspects, the CSI report configuration may indicate CMRs associated with resources for channel measurement for CSI-RSs for one or more of TRP 0 or TRP 1 as identified by the CRI value. In some aspects, an IMR value may be associated with a set of one or more resources based at least in part on the CSI value (e.g., based at least in part on whether the CRI value indicates TRP 0, TRP 1, or both TRP 0 and TRP 1. In some aspects, the CSI report configuration may also indicate transmission schemes associated with the single TRP mode or the multi-TRP mode, and/or CBs associated with the single TRP mode or the multi-TRP mode. The CSI report configuration may additionally identify PMI pairs that UE is to report if associated with the multi-TRP mode, and/or the like.

The CSI report configuration may further identify an RI pair restriction for each of TRP 0 and TRP 1 based the CRI indicating a multi-TRP mode. The RI repair restriction may indicate a combination of rank indications that are permitted to be included in a first CSI report for a first TRP and a second CSI report for a second TRP. In some aspects, a multiplexing scheme may be implicitly indicated by the RI pair restriction. For example, for an RI pair restriction that only allows RI pairs with the same rank, UE 120 may determine that the transmission scheme is FDM or TDM. This may be based at least in part on the FDM and TDM transmission schemes using RI pairs with the same rank based at least in part on the FDM and TDM transmission schemes allowing only a single codeword. For an RI pair restriction that allows RI pairs with different ranks, UE 120 may determine that the transmission scheme is SDM.

In some aspects, the single TRP mode or the multi-TRP mode may be indicated in the CSI report configuration by a CSI reference signal (CSI-RS) resource indicator, a CSI-RS resource or a set of CSI-RS resources, a CSI-RS resource set, a CSI-RS port group, a CQI, a PMI, and an RI, and/or the like.

As indicated above, FIG. 12 is provided as an example. Other examples may differ from what is described with respect to FIG. 12.

Figure 13:
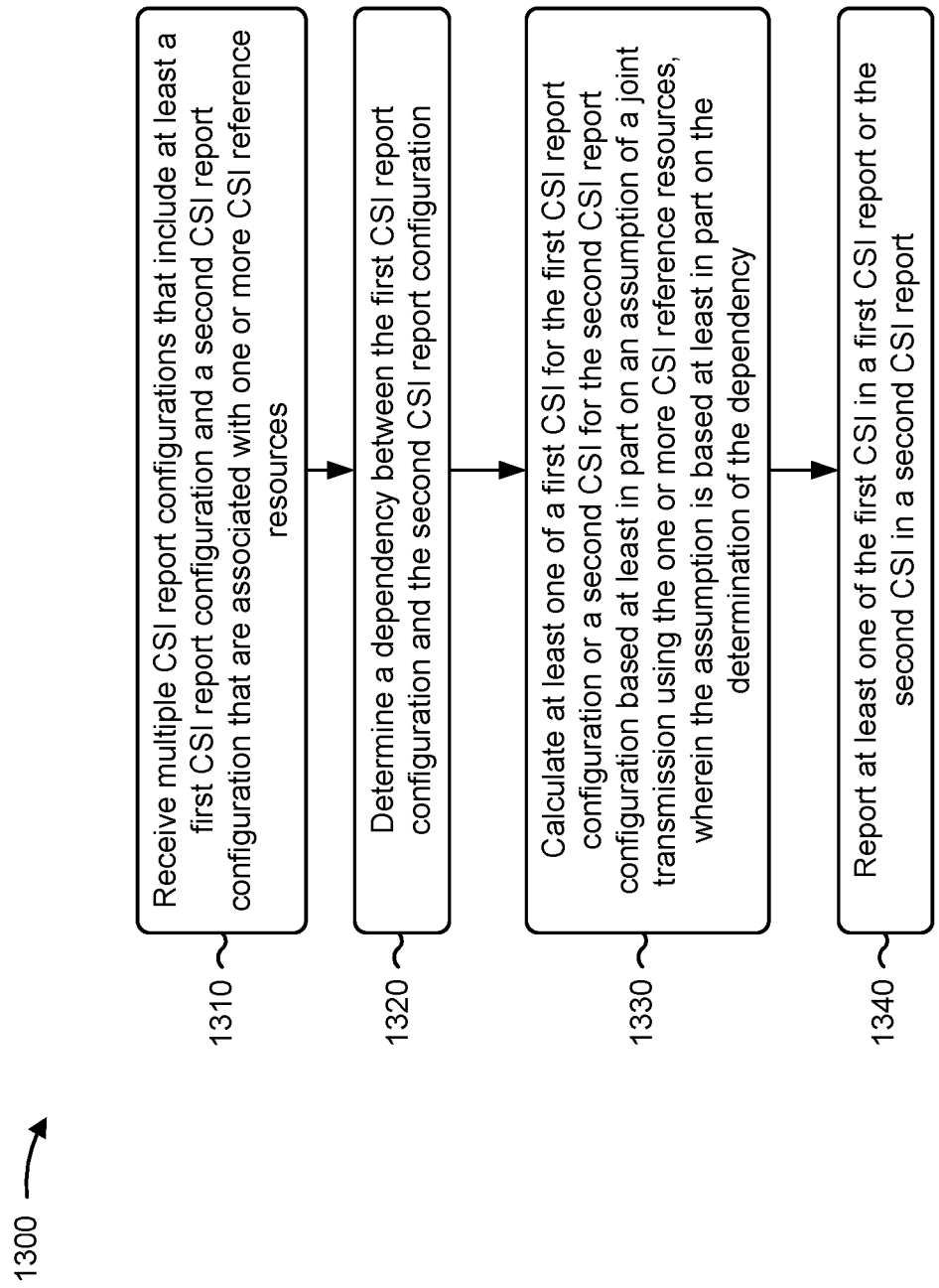
FIG. 13 is a diagram illustrating an example process performed, for example, by a user equipment, in accordance with various aspects of the present disclosure.

FIG. 13 is a diagram illustrating an example process 1300 performed, for example, by a UE, in accordance with various aspects of the present disclosure. Example process 1300 is an example where the UE (e.g., UE 120 and/or the like) performs operations associated with correlating multiple channel state information reports for multi-layer communication.

As shown in FIG. 13, in some aspects, process 1300 may include receiving multiple CSI report configurations that include at least a first CSI report configuration and a second CSI report configuration that are associated with one or more CSI reference resources (block 1310). For example, the UE (e.g., using antenna 252, DEMOD 254, MIMO detector 256, receive processor 258, controller/processor 280, and/or the like) may receive multiple CSI report configurations that include at least a first CSI report configuration and a second CSI report configuration that are associated with one or more CSI reference resources, as described above.

As further shown in FIG. 13, in some aspects, process 1300 may include determining a dependency between the first CSI report configuration and the second CSI report configuration (block 1320). For example, the UE (e.g., using controller/processor 280 and/or the like) may determine a dependency between the first CSI report configuration and the second CSI report configuration, as described above.

As further shown in FIG. 13, in some aspects, process 1300 may include calculating at least one of a first CSI for the first CSI report configuration or a second CSI for the second CSI report configuration based at least in part on an assumption of a joint transmission using the one or more CSI reference resources, wherein the assumption is based at least in part on the determination of the dependency (block 1330). For example, the UE (e.g., using controller/processor 280 and/or the like) may calculate at least one of a first CSI for the first CSI report configuration or a second CSI for the second CSI report configuration based at least in part on an assumption of a joint transmission using the one or more CSI reference resources, as described above. In some aspects, the assumption is based at least in part on the determination of the dependency.

As further shown in FIG. 13, in some aspects, process 1300 may include reporting at least one of the first CSI in a first CSI report or the second CSI in a second CSI report (block 1340). For example, the UE (e.g., using controller/processor 240, transmit processor 220, TX MIMO processor 230, MOD 232, antenna 234, and/or the like) may report at least one of the first CSI in a first CSI report or the second CSI in a second CSI report, as described above.

Process 1300 may include additional aspects, such as any single aspect or any combination of aspects described below and/or in connection with one or more other processes described elsewhere herein.

In a first aspect, the dependency between the first CSI report configuration and the second CSI report configuration comprises at least one of dependency of the second CSI report configuration on the first CSI report configuration, or mutual dependency between the first CSI report configuration and the second CSI report configuration.

In a second aspect, alone or in combination with the first aspect, the second CSI report configuration includes an indication that the first CSI report configuration is a reference CSI report configuration for the second CSI report configuration.

In a third aspect, alone or in combination with one or more of the first and second aspects, calculating the second CSI and reporting the second CSI comprises calculating and reporting the second CSI based at least in part on an assumption of interference that is based at least in part on reporting the first CSI.

In a fourth aspect, alone or in combination with one or more of the first through third aspects, process 1300 includes determining that the second CSI report configuration is associated with a spatial-division multiplexing scheme based at least in part on an indication in the second CSI report configuration; and calculating and reporting the second CSI based at least in part on the determination.

In a fifth aspect, alone or in combination with one or more of the first through fourth aspects, calculating the second CSI based at least in part on the assumption of the joint transmission using the one or more CSI reference resources comprises calculating the second CSI based at least in part on an assumption that the first CSI report and the second CSI report are to be transmitted with a same rank as indicated in the first CSI report configuration; and reporting the first CSI and the second CSI with the same rank as indicated in the first CSI report configuration.

In a sixth aspect, alone or in combination with one or more of the first through fifth aspects, process 1300 includes determining that the second CSI report configuration is associated with a frequency-division multiplexing scheme or a time-division multiplexing scheme based at least in part on an indication in the second CSI report configuration; and calculating and reporting the second CSI based at least in part on the determination.

In a seventh aspect, alone or in combination with one or more of the first through sixth aspects, determining the dependency between the first CSI report configuration and the second CSI report configuration comprises determining that the first CSI report configuration and the second CSI report configuration are mutually dependent based at least in part on at least one of a first indication in the first CSI report configuration that indicates that the second CSI report configuration is a reference of the first CSI report configuration, or a second indication in the second CSI report configuration that indicates that the first CSI report configuration is a reference of the second CSI report configuration.

In an eighth aspect, alone or in combination with one or more of the first through seventh aspects, calculating the CSI for at least one of the first CSI report configuration and the second CSI report configuration based at least in part on the assumption of the joint transmission using the one or more CSI reference resources comprises at least one of calculating the first CSI and the second CSI based at least in part on an assumption of a physical downlink shared channel communication via the first CSI and the second CSI; or calculating the first CSI based at least in part on an assumption of interference that is based at least in part on reporting the second CSI, and the second CSI based at least in part on an assumption of interference that is based at least in part on reporting the first CSI.

In a ninth aspect, alone or in combination with one or more of the first through eighth aspects, process 1300 includes determining that the second CSI report configuration is associated with a spatial-division multiplexing scheme based at least in part on an indication in the second CSI report configuration; and calculating and reporting the second CSI based at least in part on the determination.

In a tenth aspect, alone or in combination with one or more of the first through ninth aspects, calculating and reporting the CSI for at least one of the first CSI report configuration and the second CSI report configuration based at least in part on the assumption of the joint transmission using the one or more CSI reference resources comprises calculating the first CSI and calculating and reporting the second CSI, wherein the first CSI and the second CSI have a same rank; and reporting the first CSI and the second CSI with the same rank as indicated in the first CSI report configuration.

In an eleventh aspect, alone or in combination with one or more of the first through tenth aspects, process 1300 includes determining that the second CSI report configuration is associated with a frequency-division multiplexing scheme or a time-division multiplexing scheme based at least in part on an indication in the second CSI report configuration; and calculating and reporting the second CSI based at least in part on the determination.

In a twelfth aspect, alone or in combination with one or more of the first through eleventh aspects, the first CSI comprises a first CSI reference signal (CSI-RS) resource indicator (CRI), the second CSI comprises a second CRI, a first value of the first CRI and the second CRI indicates that the first CSI and the second CSI are calculated based at least in part on an assumption of independent transmissions of the first CSI report configuration using a first CSI reference resource of the one or more CSI reference resources and the second CSI report configuration using a second CSI reference resource of the one or more CSI reference resources; and a second value of the first CRI and the second CRI indicates that the first CSI and the second CSI are calculated based at least in part on an assumption of a joint transmission using a CSI reference resource of the one or more CSI reference resources that is associated with the first CSI report configuration and the second CSI report configuration.

In a thirteenth aspect, alone or in combination with one or more of the first through twelfth aspects, the first CRI and the second CRI have a same value.

In a fourteenth aspect, alone or in combination with one or more of the first through thirteenth aspects, process 1300 includes receiving an indication of a CSI reference signal (CSI-RS) resource indicator (CRI) restriction that configures the UE to report only a subset of CRI values.

In a fifteenth aspect, alone or in combination with one or more of the first through fourteenth aspects, the first CSI report and the second CSI report are triggered simultaneously.

In a sixteenth aspect, alone or in combination with one or more of the first through fifteenth aspects, the first CSI report and the second CSI report are associated with a same trigger state.

In a seventeenth aspect, alone or in combination with one or more of the first through sixteenth aspects, process 1300 includes receiving an indication in the second CSI report configuration; determining that the second CSI report configuration is dependent on the first CSI report configuration based at least in part on the indication; receiving an indication in downlink control information (DCI) that triggers the second CSI report; and determining that the first CSI report and the second CSI report are both triggered based at least in part on the dependency of the second CSI report configuration on the first CSI report configuration and the indication in the DCI that triggers the second CSI report.

In an eighteenth aspect, alone or in combination with one or more of the first through seventeenth aspects, the first CSI report is triggered at a same as, or earlier than, the second CSI report with an offset between first DCI, that triggers the first CSI report, and second DCI, that triggers the second CSI report, that is less than or equal to a first threshold.

In a nineteenth aspect, alone or in combination with one or more of the first through eighteenth aspects, the first threshold is fixed or based at least in part on a capability of the UE and a report of the capability of the UE.

In a twentieth aspect, alone or in combination with one or more of the first through nineteenth aspects, a first set of CSI reference signal (CSI-RS) resources, measured for the first CSI report, occur or begin at a same time as, or earlier than, a second set of CSI-RS resources, measured for the second CSI report, with an offset between the first set of CSI-RS resources and the second set of CSI-RS resources that is less than or equal to a second threshold.

In a twenty first aspect, alone or in combination with one or more of the first through twentieth aspects, the at least one of the first threshold or the second threshold is fixed, or the at least one of the first threshold or the second threshold is based at least in part on a capability of the UE and a report of the capability of the UE.

In a twenty second aspect, alone or in combination with one or more of the first through twenty first aspects, the first CSI report and the second CSI report are transmitted in a same physical uplink control channel resource and configured with a same slot offset.

In a twenty third aspect, alone or in combination with one or more of the first through twenty second aspects, process 1300 includes determining that the first CSI report and the second CSI report are periodic CSI reports or semi-persistent CSI reports, and a slot offset between a transmission occasion of the first CSI is reporting and a transmission occasion of the second CSI report is less than or equal to a threshold.

In a twenty fourth aspect, alone or in combination with one or more of the first through twenty third aspects, the threshold is fixed or based at least in part on a UE capability.

In a twenty fifth aspect, alone or in combination with one or more of the first through twenty fourth aspects, a periodicity of the first CSI report and a periodicity of the second CSI report are a same periodicity.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
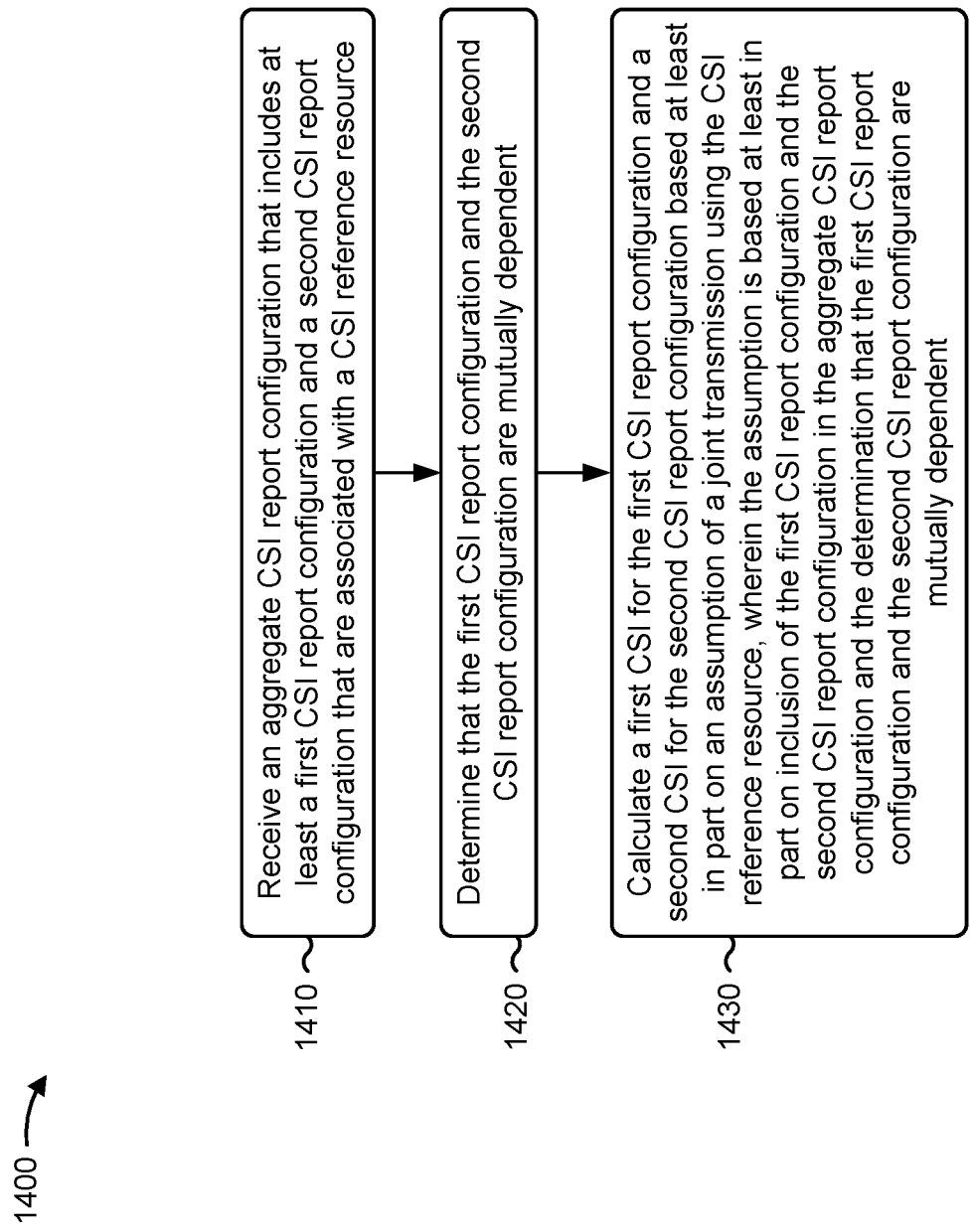
FIG. 14 is a diagram illustrating an example process performed, for example, by a user equipment, in accordance with various aspects of the present disclosure.

FIG. 14 is a diagram illustrating an example process 1400 performed, for example, by a UE, in accordance with various aspects of the present disclosure. Example process 1400 is an example where the UE (e.g., UE 120 and/or the like) performs operations associated with correlating multiple channel state information reports for multi-layer communication.

As shown in FIG. 14, in some aspects, process 1400 may include receiving an aggregate CSI report configuration that includes at least a first CSI report configuration and a second CSI report configuration that are associated with a CSI reference resource (block 1410). For example, the UE (e.g., using antenna 252, DEMOD 254, MIMO detector 256, receive processor 258, controller/processor 280, and/or the like) may receive an aggregate CSI report configuration that includes at least a first CSI report configuration and a second CSI report configuration that are associated with a CSI reference resource, as described above.

As further shown in FIG. 14, in some aspects, process 1400 may include determining that the first CSI report configuration and the second CSI report configuration are mutually dependent (block 1420). For example, the UE (e.g., using controller/processor 280 and/or the like) may determine that the first CSI report configuration and the second CSI report configuration are mutually dependent, as described above.

As further shown in FIG. 14, in some aspects, process 1400 may include calculating a first CSI for the first CSI report configuration and a second CSI for the second CSI report configuration based at least in part on an assumption of a joint transmission using the CSI reference resource, wherein the assumption is based at least in part on inclusion of the first CSI report configuration and the second CSI report configuration in the aggregate CSI report configuration and the determination that the first CSI report configuration and the second CSI report configuration are mutually dependent (block 1430). For example, the UE (e.g., using controller/processor 280 and/or the like) may calculate a first CSI for the first CSI report configuration and a second CSI for the second CSI report configuration based at least in part on an assumption of a joint transmission using the CSI reference resource, as described above. In some aspects, the assumption is based at least in part on inclusion of the first CSI report configuration and the second CSI report configuration in the aggregate CSI report configuration and the determination that the first CSI report configuration and the second CSI report configuration are mutually dependent.

Process 1400 may include additional aspects, such as any single aspect or any combination of aspects described below and/or in connection with one or more other processes described elsewhere herein.

In a first aspect, the first CSI comprises a first CSI reference signal (CSI-RS) resource indicator (CRI), the second CSI comprises a second CRI, and a value of the first CRI and the second CRI indicates that the first CSI and the second CSI are calculated based at least in part on an assumption of a joint transmission using the CSI reference resource.

In a second aspect, alone or in combination with the first aspect, the first CRI and the second CRI have a same value.

In a third aspect, alone or in combination with one or more of the first and second aspects, process 1400 includes receiving an indication of a CSI reference signal (CSI-RS) resource indicator (CRI) restriction that configures the UE to report only a subset of CRI values.

In a fourth aspect, alone or in combination with one or more of the first through third aspects, the aggregate CSI report configuration indicates a rank indication pair restriction for the first CSI report configuration and the second CSI report configuration and the rank indication pair restriction indicates a combination of rank indications that are permitted to be included in a first CSI report, associated with the first CSI report configuration, and included in a second CSI report associated with the second CSI report configuration.

In a fifth aspect, alone or in combination with one or more of the first through fourth aspects, the aggregate CSI report configuration further indicates a multiplexing scheme for the first CSI report configuration and the second CSI report configuration.

In a sixth aspect, alone or in combination with one or more of the first through fifth aspects, a multiplexing scheme of the first CSI report configuration and the second CSI report configuration is implicitly indicated by a rank indication pair restriction for the first CSI report configuration and the second CSI report configuration and the multiplexing scheme is indicated as a time-division multiplexing scheme or a frequency-division multiplexing scheme based at least in part on a common rank restriction in the rank indication pair restriction.

In a seventh aspect, alone or in combination with one or more of the first through sixth aspects, calculating the first CSI and the second CSI based at least in part on the assumption of the joint transmission using the CSI reference resource comprises at least one of calculating the first CSI and the second CSI based at least in part on an assumption of a physical downlink shared channel communication via the first CSI and the second CSI; or calculating the first CSI based at least in part on an assumption of interference that is based at least in part on reporting the second CSI, and the second CSI based at least in part on an assumption of interference that is based at least in part on reporting the first CSI.

In an eighth aspect, alone or in combination with one or more of the first through seventh aspects, calculating and reporting the CSI for at least one of the first CSI report configuration and the second CSI report configuration based at least in part on the assumption of the joint transmission using the CSI reference resource comprises calculating and reporting the first CSI and calculating and reporting the second CSI, wherein the first CSI and the second CSI have a same rank.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
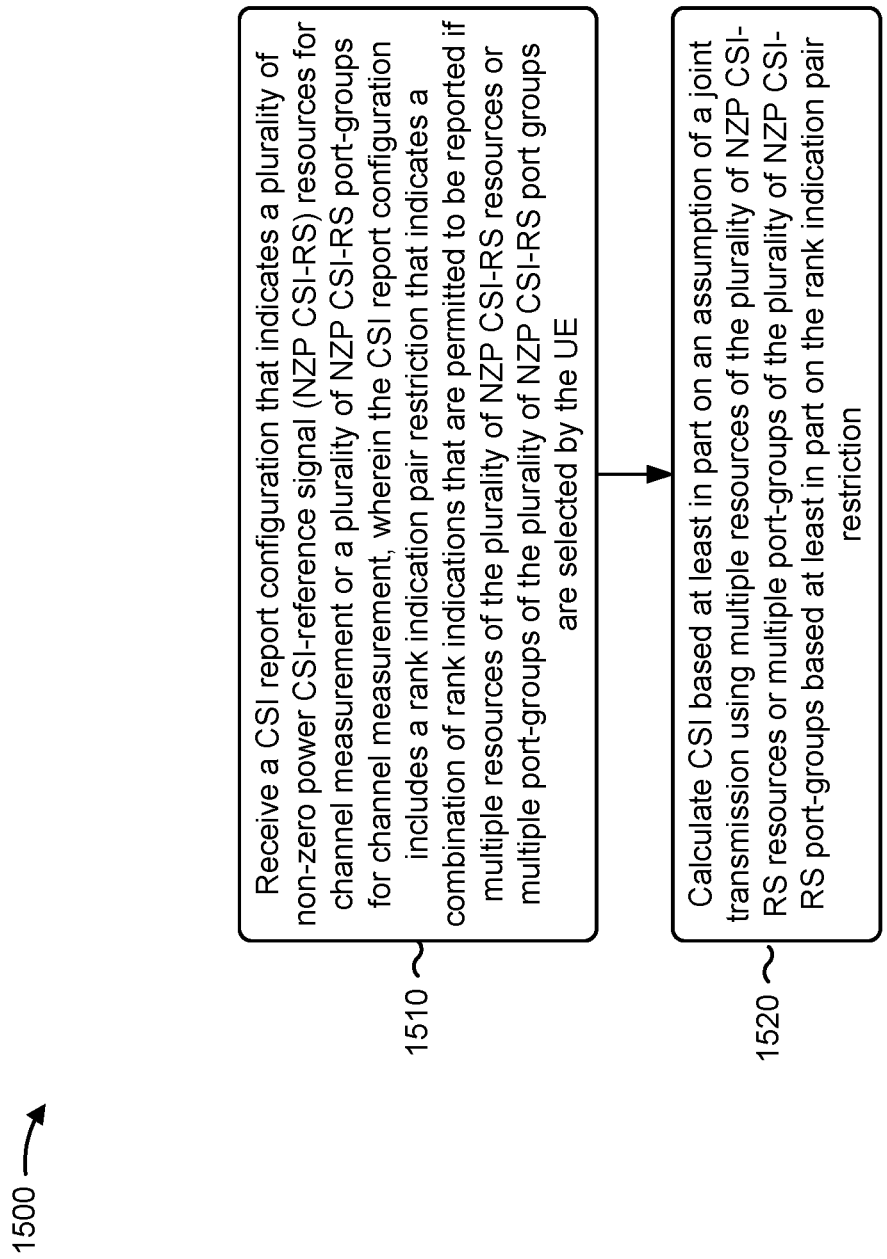
FIG. 15 is a diagram illustrating an example process performed, for example, by a user equipment, in accordance with various aspects of the present disclosure.

FIG. 15 is a diagram illustrating an example process 1500 performed, for example, by a UE, in accordance with various aspects of the present disclosure. Example process 1500 is an example where the UE (e.g., UE 120 and/or the like) performs operations associated with correlating multiple channel state information reports for multi-layer communication.

As shown in FIG. 15, in some aspects, process 1500 may include receiving a CSI report configuration that indicates a plurality of NZP CSI-RS resources for channel measurement or a plurality of NZP CSI-RS port-groups for channel measurement, wherein the CSI report configuration includes a rank indication pair restriction that indicates a combination of rank indications that are permitted to be reported if multiple resources of the plurality of NZP CSI-RS resources or multiple port-groups of the plurality of NZP CSI-RS port groups are selected by the UE (block 1510). For example, the UE (e.g., using antenna 252, DEMOD 254, MIMO detector 256, receive processor 258, controller/processor 280, and/or the like) may receive a CSI report configuration that indicates a plurality of NZP CSI-RS resources for channel measurement or a plurality of NZP CSI-RS port-groups for channel measurement, as described above. In some aspects, the CSI report configuration includes a rank indication pair restriction that indicates a combination of rank indications that are permitted to be reported if multiple resources of the plurality of NZP CSI-RS resources or multiple port-groups of the plurality of NZP CSI-RS port groups are selected by the UE.

As further shown in FIG. 15, in some aspects, process 1500 may include calculating CSI based at least in part on an assumption of a joint transmission using multiple resources of the plurality of NZP CSI-RS resources or multiple port-groups of the plurality of NZP CSI-RS port-groups based at least in part on the rank indication pair restriction (block 1520). For example, the UE (e.g., using controller/processor 280 and/or the like) may calculate CSI based at least in part on an assumption of a joint transmission using multiple resources of the plurality of NZP CSI-RS resources or multiple port-groups of the plurality of NZP CSI-RS port-groups based at least in part on the rank indication pair restriction, as described above.

Process 1500 may include additional aspects, such as any single aspect or any combination of aspects described below and/or in connection with one or more other processes described elsewhere herein.

In a first aspect, process 1500 includes reporting the CSI to a network associated with the CSI report configurations.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
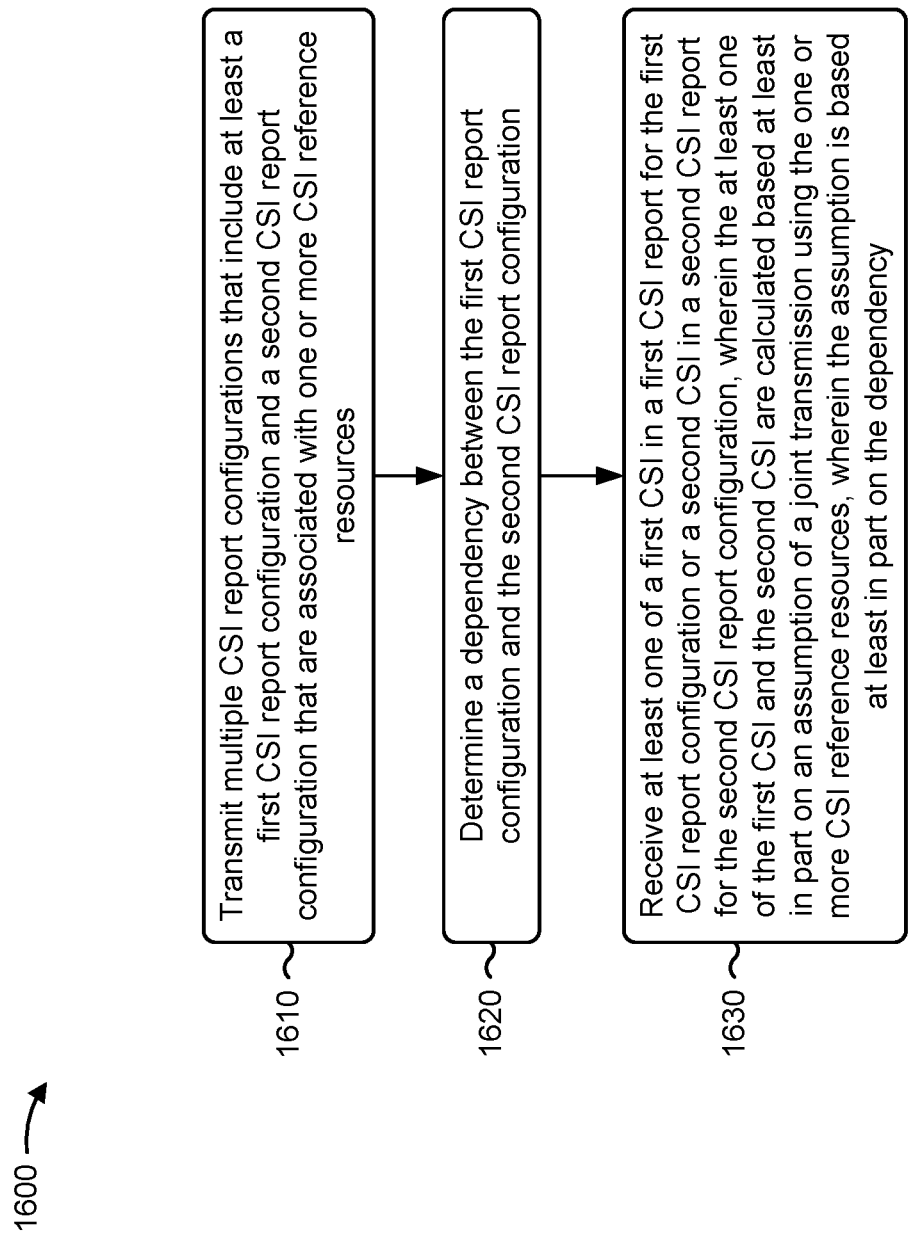
FIG. 16 is a diagram illustrating an example process performed, for example, by a user equipment, in accordance with various aspects of the present disclosure.

FIG. 16 is a diagram illustrating an example process 1600 performed, for example, by a base station, in accordance with various aspects of the present disclosure. Example process 1600 is an example where the base station (e.g., base station 110 and/or the like) performs operations associated with correlating multiple channel state information reports for multi-layer communication.

As shown in FIG. 16, in some aspects, process 1600 may include transmitting multiple CSI report configurations that include at least a first CSI report configuration and a second CSI report configuration that are associated with one or more CSI reference resources (block 1610). For example, the base station (e.g., using controller/processor 240, transmit processor 220, TX MIMO processor 230, MOD 232, antenna 234, and/or the like) may transmit multiple CSI report configurations that include at least a first CSI report configuration and a second CSI report configuration that are associated with one or more CSI reference resources, as described above.

As further shown in FIG. 16, in some aspects, process 1600 may include determining a dependency between the first CSI report configuration and the second CSI report configuration (block 1620). For example, the base station (e.g., using controller/processor 240 and/or the like) may determine a dependency between the first CSI report configuration and the second CSI report configuration, as described above.

As further shown in FIG. 16, in some aspects, process 1600 may include receiving at least one of a first CSI in a first CSI report for the first CSI report configuration or a second CSI in a second CSI report for the second CSI report configuration, wherein the at least one of the first CSI and the second CSI are calculated based at least in part on an assumption of a joint transmission using the one or more CSI reference resources, wherein the assumption is based at least in part on the dependency (block 1630). For example, the base station (e.g., using antenna 234, DEMOD 232, MIMO detector 236, receive processor 238, controller/processor 240, and/or the like) may receive at least one of a first CSI in a first CSI report for the first CSI report configuration or a second CSI in a second CSI report for the second CSI report configuration, as described above. In some aspects, the at least one of the first CSI and the second CSI are calculated based at least in part on an assumption of a joint transmission using the one or more CSI reference resources. In some aspects, the assumption is based at least in part on the dependency.

Process 1600 may include additional aspects, such as any single aspect or any combination of aspects described below and/or in connection with one or more other processes described elsewhere herein.

In a first aspect, the dependency between the first CSI report configuration and the second CSI report configuration comprises at least one of dependency of the second CSI report configuration on the first CSI report configuration, or mutual dependency between the first CSI report configuration and the second CSI report configuration.

In a second aspect, alone or in combination with the first aspect, process 1600 includes transmitting an indication in the second CSI report configuration indicating that the first CSI report configuration is a reference CSI report configuration for the second CSI report configuration, and wherein determining the dependency between the first CSI report configuration and the second CSI report configuration comprises determining that the second CSI report configuration is dependent on the first CSI report configuration based at least in part on the indication in the second CSI report configuration indicating that the first CSI report configuration is a reference report configuration for the second CSI report configuration.

In a third aspect, alone or in combination with one or more of the first and second aspects, the second CSI is calculated based at least in part on an assumption of interference that is based at least in part on reporting the first CSI.

In a fourth aspect, alone or in combination with one or more of the first through third aspects, process 1600 includes transmitting an indication in the second CSI report configuration indicating that the second CSI report configuration is associated with a spatial-division multiplexing scheme, and the second CSI is calculated based at least in part on the indication.

In a fifth aspect, alone or in combination with one or more of the first through fourth aspects, process 1600 includes receiving the second CSI with a same rank as the first CSI.

In a sixth aspect, alone or in combination with one or more of the first through fifth aspects, process 1600 includes transmitting an indication in the second CSI report configuration indicating that the second CSI report configuration is associated with a frequency-division multiplexing scheme or a time-division multiplexing scheme, and the second CSI is calculated based at least in part on the indication.

In a seventh aspect, alone or in combination with one or more of the first through sixth aspects, determining the dependency between the first CSI report configuration and the second CSI report configuration comprises determining that the first CSI report configuration and the second CSI report configuration are mutually dependent based at least in part on at least one of transmitting a first indication in the first CSI report configuration that indicates that the second CSI report configuration is a reference of the first CSI report configuration, or transmitting a second indication in the second CSI report configuration that indicates that the first CSI report configuration is a reference of the second CSI report configuration.

In an eighth aspect, alone or in combination with one or more of the first through seventh aspects, the first CSI and the second CSI are calculated based at least in part on an assumption of a physical downlink shared channel communication via the first CSI and the second CSI; or the first CSI is calculated based at least in part on an assumption of interference that is based at least in part on reporting the second CSI, and the second CSI is calculated based at least in part on an assumption of interference that is based at least in part on reporting the first CSI.

In a ninth aspect, alone or in combination with one or more of the first through eighth aspects, process 1600 includes transmitting an indication in the second CSI report configuration indicating that the second CSI report configuration is associated with a spatial-division multiplexing scheme, and the second CSI is calculated based at least in part on the indication.

In a tenth aspect, alone or in combination with one or more of the first through ninth aspects, process 1600 includes receiving the second CSI with a same rank as the first CSI.

In an eleventh aspect, alone or in combination with one or more of the first through tenth aspects, process 1600 includes transmitting an indication in the second CSI report configuration indicating that the second CSI report configuration is associated with a frequency-division multiplexing scheme or a time-division multiplexing scheme, and the second CSI is calculated based at least in part on the indication.

In a twelfth aspect, alone or in combination with one or more of the first through eleventh aspects, the first CSI comprises a first CSI reference signal (CSI-RS) resource indicator (CRI), the second CSI comprises a second CRI, a first value of the first CRI and the second CRI indicates that the first CSI and the second CSI are calculated based at least in part on an assumption of independent transmissions of the first CSI report configuration using a first CSI reference resource of the one or more CSI reference resources and the second CSI report configuration using a second CSI reference resource of the one or more CSI reference resources; and a second value of the first CRI and the second CRI indicates that the first CSI and the second CSI are calculated based at least in part on an assumption of a joint transmission using a CSI reference resource of the one or more CSI reference resources that is associated with the first CSI report configuration and the second CSI report configuration.

In a thirteenth aspect, alone or in combination with one or more of the first through twelfth aspects, the first CRI and the second CRI have a same value.

In a fourteenth aspect, alone or in combination with one or more of the first through thirteenth aspects, process 1600 includes transmitting an indication of a CSI reference signal (CSI-RS) resource indicator (CRI) restriction that configures the UE to report only a subset of CRI values.

In a fifteenth aspect, alone or in combination with one or more of the first through fourteenth aspects, process 1600 includes transmitting downlink signaling wherein the downlink is signaling triggers the first CSI report and the second CSI report simultaneously.

In a sixteenth aspect, alone or in combination with one or more of the first through fifteenth aspects, process 1600 includes transmitting a configuration that the first CSI report configuration and the second CSI report configuration are in a same trigger state; and transmitting the downlink signaling to trigger the trigger state for the first CSI report configuration and the second CSI report configuration.

In a seventeenth aspect, alone or in combination with one or more of the first through sixteenth aspects, process 1600 includes transmitting an indication in the second CSI report configuration; determining that the second CSI report configuration is dependent on the first CSI report configuration based at least in part on the indication; transmitting an indication in downlink control information (DCI) that triggers the second CSI report; and determining that the first CSI report and the second CSI report are both triggered based at least in part on the dependency of the second CSI report configuration on the first CSI report configuration and the indication in the DCI that triggers the second CSI report.

In an eighteenth aspect, alone or in combination with one or more of the first through seventeenth aspects, process 1600 includes triggering the first CSI report at a first time; and triggering the second CSI report at a second time, wherein the first time is at a same time as the second time, or the first time is earlier than the second time with an offset that is less than or equal to a first threshold.

In a nineteenth aspect, alone or in combination with one or more of the first through eighteenth aspects, process 1600 includes determining the first threshold based at least in part on a reported capability of a UE, or determining the first threshold based at least in part on a fixed value that is independent from a capability of the UE.

In a twentieth aspect, alone or in combination with one or more of the first through nineteenth aspects, process 1600 includes transmitting a first CSI-RS to be measured for the first CSI report at a third time; transmitting a second CSI-RS to be measured for the second CSI report at a fourth time, wherein the third time is at a same time as the fourth time, or the third time is earlier than the fourth time with an offset that is less than or equal to a second threshold.

In a twenty first aspect, alone or in combination with one or more of the first through twentieth aspects, process 1600 includes determining at least one of the first threshold or the second threshold based at least in part on a reported capability of the UE, or determining at least one of the first threshold or the second threshold based at least in part on a fixed value that is independent from a capability of the UE.

In a twenty second aspect, alone or in combination with one or more of the first through twenty first aspects, process 1600 includes configuring or scheduling the UE to transmit the first CSI report and the second CSI report in a same physical uplink control channel with a same slot offset.

In a twenty third aspect, alone or in combination with one or more of the first through twenty second aspects, process 1600 includes configuring the first CSI report and the second CSI report as periodic CSI reports or semi-persistent CSI reports, wherein a slot offset between a transmission occasion of the first CSI is reporting and a transmission occasion of the second CSI report is less than or equal to a threshold.

In a twenty fourth aspect, alone or in combination with one or more of the first through twenty third aspects, process 1600 includes determining the threshold based at least in part on a reported capability of the UE, or determining the threshold based at least in part on a fixed value that is independent from a capability of the UE.

In a twenty fifth aspect, alone or in combination with one or more of the first through twenty fourth aspects, process 1600 includes configuring the first CSI report and the second CSI report to have a same periodicity.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
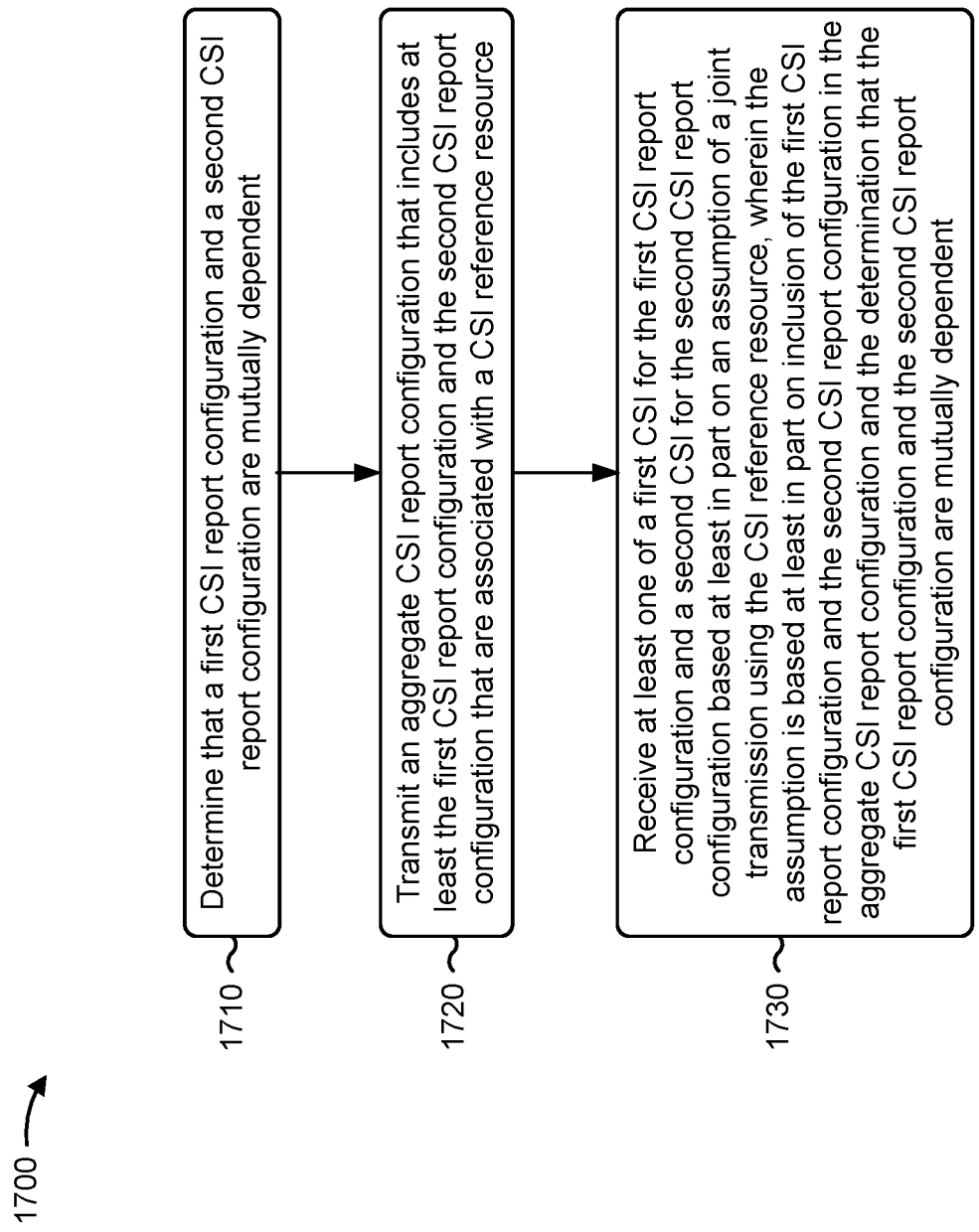
FIG. 17 is a diagram illustrating an example process performed, for example, by a user equipment, in accordance with various aspects of the present disclosure.

FIG. 17 is a diagram illustrating an example process 1700 performed, for example, by a base station, in accordance with various aspects of the present disclosure. Example process 1700 is an example where the base station (e.g., base station 110 and/or the like) performs operations associated correlating multiple channel state information reports for multi-layer communication.

As shown in FIG. 17, in some aspects, process 1700 may include determining that a first CSI report configuration and a second CSI report configuration are mutually dependent (block 1710). For example, the base station (e.g., using controller/processor 240 and/or the like) may determine that a first CSI report configuration and a second CSI report configuration are mutually dependent, as described above.

As further shown in FIG. 17, in some aspects, process 1700 may include transmitting an aggregate CSI report configuration that includes at least the first CSI report configuration and the second CSI report configuration that are associated with a CSI reference resource (block 1720). For example, the base station (e.g., using controller/processor 240, transmit processor 220, TX MIMO processor 230, MOD 232, antenna 234, and/or the like) may transmit an aggregate CSI report configuration that includes at least the first CSI report configuration and the second CSI report configuration that are associated with a CSI reference resource, as described above.

As further shown in FIG. 17, in some aspects, process 1700 may include receiving at least one of a first CSI for the first CSI report configuration and a second CSI for the second CSI report configuration based at least in part on an assumption of a joint transmission using the CSI reference resource, wherein the assumption is based at least in part on inclusion of the first CSI report configuration and the second CSI report configuration in the aggregate CSI report configuration and the determination that the first CSI report configuration and the second CSI report configuration are mutually dependent (block 1730). For example, the base station (e.g., using antenna 252, DEMOD 254, MIMO detector 256, receive processor 258, controller/processor 280, and/or the like) may receive at least one of a first CSI for the first CSI report configuration and a second CSI for the second CSI report configuration based at least in part on an assumption of a joint transmission using the CSI reference resource, as described above. In some aspects, the assumption is based at least in part on inclusion of the first CSI report configuration and the second CSI report configuration in the aggregate CSI report configuration and the determination that the first CSI report configuration and the second CSI report configuration are mutually dependent.

Process 1700 may include additional aspects, such as any single aspect or any combination of aspects described below and/or in connection with one or more other processes described elsewhere herein.

In a first aspect, the first CSI comprises a first CSI reference signal (CSI-RS) resource indicator (CRI), the second CSI comprises a second CRI, and a value of the first CRI and the second CRI indicates that the first CSI and the second CSI are calculated based at least in part on an assumption of a joint transmission using the CSI reference resource.

In a second aspect, alone or in combination with the first aspect, the first CRI and the second CRI have a same value.

In a third aspect, alone or in combination with one or more of the first and second aspects, process 1700 includes transmitting an indication of a CSI reference signal (CSI-RS) resource indicator (CRI) restriction that configures a user equipment to report only a subset of CRI values.

In a fourth aspect, alone or in combination with one or more of the first through third aspects, process 1700 includes transmitting a rank indication pair restriction for the first CSI report configuration and the second CSI report configuration, wherein the rank indication pair restriction is indicating a combination of rank indications that are permitted to be included in a first CSI report, associated with the first CSI report configuration, and included in a second CSI report associated with the second CSI report configuration.

In a fifth aspect, alone or in combination with one or more of the first through fourth aspects, process 1700 includes transmitting an indication indicating a multiplexing scheme for the first CSI report configuration and the second CSI report configuration.

In a sixth aspect, alone or in combination with one or more of the first through fifth aspects, process 1700 includes transmitting a rank-pair restriction indication, jointly indicating a rank-pair restriction and a multiplexing scheme for the first CSI report configuration and the second report configuration.

In a seventh aspect, alone or in combination with one or more of the first through sixth aspects, the first CSI and the second CSI are calculated based at least in part on an assumption of a physical downlink shared channel communication via the first CSI and the second CSI; or the first CSI is calculated based at least in part on an assumption of interference that is based at least in part on reporting the second CSI, and the second CSI is calculated based at least in part on an assumption of interference that is based at least in part on reporting the first CSI.

In an eighth aspect, alone or in combination with one or more of the first through seventh aspects, process 1700 includes receiving the second CSI with a same rank as the first CSI Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
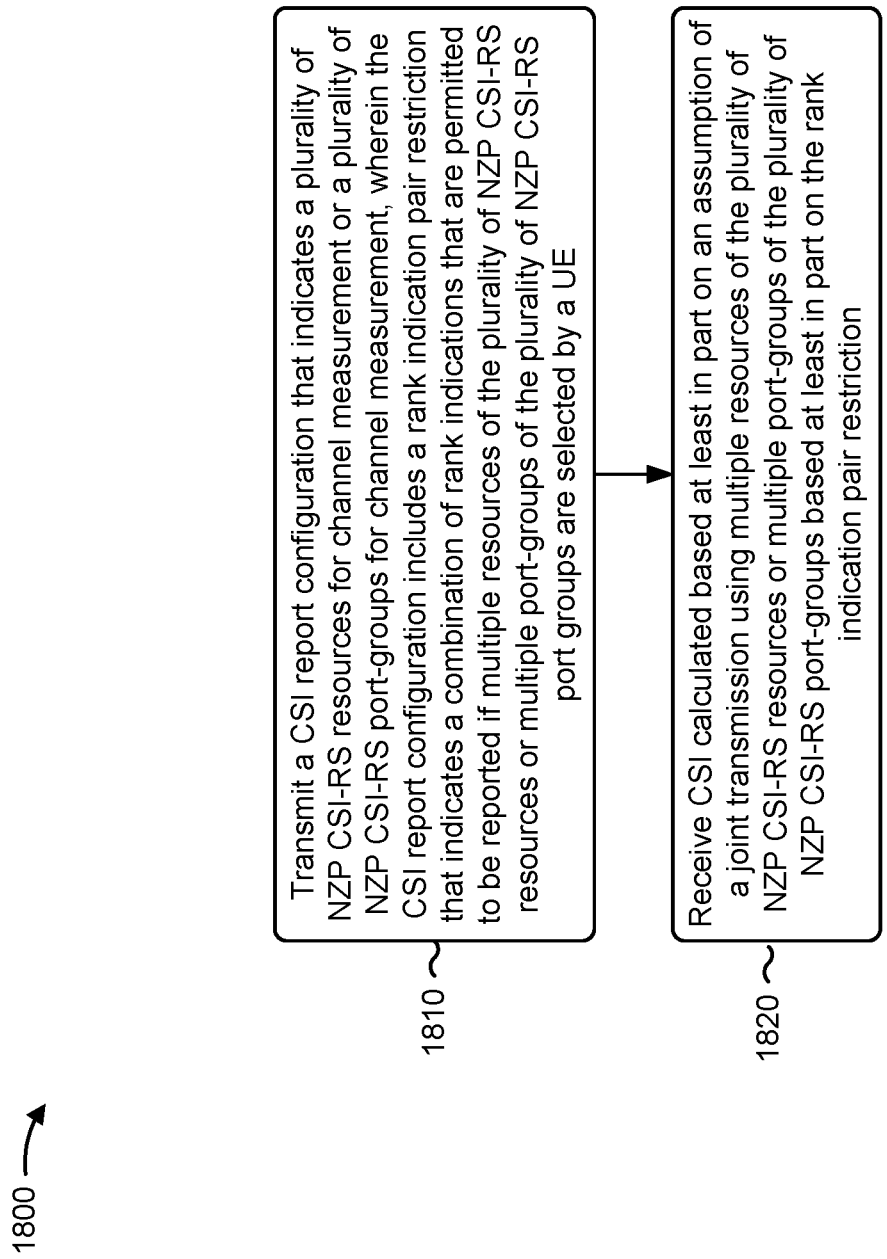
FIG. 18 is a diagram illustrating an example process performed, for example, by a user equipment, in accordance with various aspects of the present disclosure.

FIG. 18 is a diagram illustrating an example process 1800 performed, for example, by a base station, in accordance with various aspects of the present disclosure. Example process 1800 is an example where the base station (e.g., base station 110 and/or the like) performs operations associated correlating multiple channel state information reports for multi-layer communication.

As shown in FIG. 18, in some aspects, process 1800 may include transmitting a CSI report configuration that indicates a plurality of NZP CSI-RS resources for channel measurement or a plurality of NZP CSI-RS port-groups for channel measurement, wherein the CSI report configuration includes a rank indication pair restriction that indicates a combination of rank indications that are permitted to be reported if multiple resources of the plurality of NZP CSI-RS resources or multiple port-groups of the plurality of NZP CSI-RS port groups are selected by a UE (block 1810). For example, the base station (e.g., using controller/processor 240, transmit processor 220, TX MIMO processor 230, MOD 232, antenna 234, and/or the like) may transmit a CSI report configuration that indicates a plurality of NZP CSI-RS resources for channel measurement or a plurality of NZP CSI-RS port-groups for channel measurement, as described above. In some aspects, the CSI report configuration includes a rank indication pair restriction that indicates a combination of rank indications that are permitted to be reported if multiple resources of the plurality of NZP CSI-RS resources or multiple port-groups of the plurality of NZP CSI-RS port groups are selected by a UE.

As further shown in FIG. 18, in some aspects, process 1800 may include receiving CSI calculated based at least in part on an assumption of a joint transmission using multiple resources of the plurality of NZP CSI-RS resources or multiple port-groups of the plurality of NZP CSI-RS port-groups based at least in part on the rank indication pair restriction (block 1820). For example, the base station (e.g., using antenna 252, DEMOD 254, MIMO detector 256, receive processor 258, controller/processor 280, and/or the like) may receive CSI calculated based at least in part on an assumption of a joint transmission using multiple resources of the plurality of NZP CSI-RS resources or multiple port-groups of the plurality of NZP CSI-RS port-groups based at least in part on the rank indication pair restriction, as described above.

Process 1800 may include additional aspects, such as any single aspect or any combination of aspects described below and/or in connection with one or more other processes described elsewhere herein.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving multiple channel state information (CSI) report configurations that include at least a first CSI report configuration and a second CSI report configuration that are associated with one or more CSI reference resources,
wherein the second CSI report configuration includes an indication that the first CSI report configuration is a reference CSI report configuration for the second CSI report configuration;
determining a dependency between the first CSI report configuration and the second CSI report configuration;
calculating at least one of a first CSI for the first CSI report configuration or a second CSI for the second CSI report configuration based at least in part on an assumption of a joint transmission using the one or more CSI reference resources, wherein the assumption is based at least in part on the determination of the dependency; and
reporting at least one of the first CSI in a first CSI report or the second CSI in a second CSI report.

2. The method of claim 1, wherein the dependency between the first CSI report configuration and the second CSI report configuration comprises at least one of:
dependency of the second CSI report configuration on the first CSI report configuration, or
mutual dependency between the first CSI report configuration and the second CSI report configuration.

3. A user equipment (UE) for wireless communication, comprising:
a memory; and
one or more processors, coupled to the memory, configured to:
receive multiple channel state information (CSI) report configurations that include at least a first CSI report configuration and a second CSI report configuration that are associated with one or more CSI reference resources,
wherein the second CSI report configuration includes an indication that the first CSI report configuration is a reference CSI report configuration for the second CSI report configuration;
determine a dependency between the first CSI report configuration and the second CSI report configuration;
calculate at least one of a first CSI for the first CSI report configuration or a second CSI for the second CSI report configuration based at least in part on an assumption of a joint transmission using the one or more CSI reference resources,
wherein the assumption is based at least in part on the determination of the dependency; and
report at least one of the first CSI in a first CSI report or the second CSI in a second CSI report.

4. The UE of claim 3, wherein the dependency between the first CSI report configuration and the second CSI report configuration comprises at least one of:
dependency of the second CSI report configuration on the first CSI report configuration, or
mutual dependency between the first CSI report configuration and the second CSI report configuration.

5. The UE of claim 3,
wherein the one or more processors, to determine the dependency between the first CSI report configuration and the second CSI report configuration, are configured to:
determine that the second CSI report configuration is dependent on the first CSI report configuration based at least in part on the indication that the first CSI report configuration is the reference CSI report configuration for the second CSI report configuration.

6. The UE of claim 3, wherein the one or more processors, to determine the dependency between the first CSI report configuration and the second CSI report configuration, are configured to:
determine that the first CSI report configuration and the second CSI report configuration are mutually dependent based at least in part on at least one of:
an indication in the first CSI report configuration that indicates that the second CSI report configuration is a reference of the first CSI report configuration, or
the indication in the second CSI report configuration that indicates that the first CSI report configuration is the reference CSI report configuration for the second CSI report configuration.

7. The UE of claim 6, wherein the one or more processors, to calculate the CSI for at least one of the first CSI report configuration and the second CSI report configuration based at least in part on the assumption of the joint transmission using the one or more CSI reference resources, are configured to:
calculate the first CSI and the second CSI based at least in part on an assumption of a physical downlink shared channel communication via the first CSI and the second CSI; or
calculate:
the first CSI based at least in part on an assumption of interference that is based at least in part on reporting the second CSI, and
the second CSI based at least in part on an assumption of interference that is based at least in part on reporting the first CSI.

8. The UE of claim 7, wherein the one or more processors are further configured to:
determine that the second CSI report configuration is associated with a spatial-division multiplexing scheme based at least in part on an indication in the second CSI report configuration; and
calculate and report the second CSI based at least in part on the determination.

9. The UE of claim 7, wherein the one or more processors, to calculate and report the CSI for at least one of the first CSI report configuration and the second CSI report configuration based at least in part on the assumption of the joint transmission using the one or more CSI reference resources, are configured to:
calculate the first CSI and calculate and report the second CSI, wherein the first CSI and the second CSI have a same rank; and
report the first CSI and the second CSI with the same rank as indicated in the first CSI report configuration.

10. The UE of claim 9, wherein the one or more processors are further configured to:

determine that the second CSI report configuration is associated with a frequency-division multiplexing scheme or a time-division multiplexing scheme based at least in part on an indication in the second CSI report configuration; and calculate and report the second CSI based at least in part on the determination.

11. The UE of claim 3, wherein the first CSI comprises a first CSI reference signal (CSI-RS) resource indicator (CRI), wherein the second CSI comprises a second CRI, wherein a first value of the first CRI and the second CRI indicates that the first CSI and the second CSI are calculated based at least in part on an assumption of independent transmissions of the first CSI report configuration using a first CSI reference resource of the one or more CSI reference resources and the second CSI report configuration using a second CSI reference resource of the one or more CSI reference resources; and wherein a second value of the first CRI and the second CRI indicates that the first CSI and the second CSI are calculated based at least in part on an assumption of a joint transmission using a CSI reference resource of the one or more CSI reference resources that is associated with the first CSI report configuration and the second CSI report configuration.

12. The UE of claim 3, wherein the one or more processors are further configured to:

receive an indication of a CSI reference signal (CSI-RS) resource indicator (CRI) restriction that configures the UE to report only a subset of CRI values.

13. The UE of claim 3, wherein the first CSI report and the second CSI report are triggered simultaneously.

14. The UE of claim 13, wherein the one or more processors are further configured to:

receive an indication in the second CSI report configuration;

determine that the second CSI report configuration is dependent on the first CSI report configuration based at least in part on the indication;

receive an indication in downlink control information (DCI) that triggers the second CSI report; and determine that the first CSI report and the second CSI report are both triggered based at least in part on the dependency of the second CSI report configuration on the first CSI report configuration and the indication in the DCI that triggers the second CSI report.

15. The UE of claim 3, wherein the first CSI report is triggered at a same as, or earlier than, the second CSI report with an offset between first DCI, that triggers the first CSI report, and second DCI, that triggers the second CSI report, that is less than or equal to a first threshold.

16. The UE of claim 15, wherein a first set of CSI reference signal (CSI-RS) resources, measured for the first CSI report, occur or begin at a same time as, or earlier than, a second set of CSI-RS resources, measured for the second CSI report, with an offset between the first set of CSI-RS resources and the second set of CSI-RS resources that is less than or equal to a second threshold.

17. The UE of claim 16, wherein the at least one of the first threshold or the second threshold is fixed, or wherein the at least one of the first threshold or the second threshold is based at least in part on a capability of the UE and a report of the capability of the UE.

18. The UE of claim 15, wherein the first CSI report and the second CSI report are transmitted in a same physical uplink control channel resource and configured with a same slot offset.

19. The UE of claim 3, wherein the one or more processors are further configured to:

determine that the first CSI report and the second CSI report are periodic CSI reports or semi-persistent CSI reports, wherein a slot offset between a transmission occasion of the first CSI report and a transmission occasion of the second CSI report is less than or equal to a threshold.

20. The UE of claim 19, wherein a periodicity of the first CSI report and a periodicity of the second CSI report are a same periodicity.

21. A user equipment (UE) for wireless communication, comprising:

a memory; and one or more processors, coupled to the memory, configured to:

receive an aggregate channel state information (CSI) report configuration that includes at least a first CSI report configuration and a second CSI report configuration that are associated with a CSI reference resource;

determine that the first CSI report configuration and the second CSI report configuration are mutually dependent; and calculate a first CSI for the first CSI report configuration and a second CSI for the second CSI report configuration based at least in part on an assumption of a joint transmission using the CSI reference resource, wherein the assumption is based at least in part on inclusion of the first CSI report configuration and the second CSI report configuration in the aggregate CSI report configuration and the determination that the first CSI report configuration and the second CSI report configuration are mutually dependent.

22. The UE of claim 21, wherein the first CSI comprises a first CSI reference signal (CSI-RS) resource indicator (CRI), wherein the second CSI comprises a second CRI, and wherein a value of the first CRI and the second CRI indicates that the first CSI and the second CSI are calculated based at least in part on an assumption of a joint transmission using the CSI reference resource.

23. The UE of claim 21, wherein the one or more processors are further configured to:

receive an indication of a CSI reference signal (CSI-RS) resource indicator (CRI) restriction that configures the UE to report only a subset of CRI values.

24. The UE of claim 21, wherein the aggregate CSI report configuration indicates a rank indication pair restriction for the first CSI report configuration and the second CSI report configuration, and wherein the rank indication pair restriction indicates a combination of rank indications that are permitted to be included in a first CSI report, associated with the first CSI report configuration, and included in a second CSI report associated with the second CSI report configuration.

25. The UE of claim 24, wherein the aggregate CSI report configuration further indicates a multiplexing scheme for the first CSI report configuration and the second CSI report configuration.

26. The UE of claim 21, wherein a multiplexing scheme of the first CSI report configuration and the second CSI report configuration is implicitly indicated by a rank indication pair restriction for the first CSI report configuration and the second CSI report configuration, and wherein the multiplexing scheme is indicated as a time-division multiplexing scheme or a frequency-division multiplexing scheme based at least in part on a common rank restriction in the rank indication pair restriction.

27. The UE of claim 21, wherein the one or more processors, to calculate the first CSI and the second CSI based at least in part on the assumption of the joint transmission using the CSI reference resource, are configured to:

calculate the first CSI and the second CSI based at least in part on an assumption of a physical downlink shared channel communication via the first CSI and the second CSI; or calculate:
the first CSI based at least in part on an assumption of interference that is based at least in part on reporting the second CSI, and
the second CSI based at least in part on an assumption of interference that is based at least in part on reporting the first CSI.

28. The UE of claim 21, wherein the one or more processors, to calculate and report the first CSI for the first CSI report configuration and the second CSI for the second CSI report configuration based at least in part on the assumption of the joint transmission using the CSI reference resource, are configured to:

calculate and report the first CSI and calculate and report the second CSI, wherein the first CSI and the second CSI have a same rank.

29. A user equipment (UE) for wireless communication, comprising:
a memory; and
one or more processors, coupled to the memory, configured to:
receive a channel state information (CSI) report configuration that indicates a plurality of non-zero power CSI-reference signal (NZP CSI-RS) resources for channel measurement or a plurality of NZP CSI-RS port-groups for channel measurement,
wherein the CSI report configuration includes a rank indication pair restriction that indicates a combination of rank indications that are permitted to be reported if multiple resources of the plurality of NZP CSI-RS resources or multiple port-groups of the plurality of NZP CSI-RS port groups are selected by the UE; and
calculate CSI based at least in part on an assumption of a joint transmission using multiple resources of the plurality of NZP CSI-RS resources or multiple port-groups of the plurality of NZP CSI-RS port-groups based at least in part on the rank indication pair restriction.

30. The UE of claim 29, wherein the one or more processors are further configured to:
report the CSI to a network associated with the CSI report configurations.

* * * * *